(12) United States Patent
McQueary, III

(10) Patent No.: US 12,175,378 B2
(45) Date of Patent: Dec. 24, 2024

(54) DECISION TREE NATIVE TO GRAPH DATABASE

(71) Applicant: ORACLE FINANCIAL SERVICES SOFTWARE LIMITED, Mumbai (IN)

(72) Inventor: Richard Anthony McQueary, III, Jersey City, NJ (US)

(73) Assignee: Oracle Financial Services Software Limited, Mumbai (IN)

( * ) Notice: Subject to any disclaimer, the term of this patent is extended or adjusted under 35 U.S.C. 154(b) by 898 days.

(21) Appl. No.: 17/193,432

(22) Filed: Mar. 5, 2021

(65) Prior Publication Data

US 2022/0284307 A1    Sep. 8, 2022

(51) Int. Cl.
```
G06N 20/20      (2019.01)
G06F 16/901     (2019.01)
G06N 5/01       (2023.01)
G06N 5/04       (2023.01)
```

(52) U.S. Cl.
CPC ........... *G06N 5/01* (2023.01); *G06F 16/9024* (2019.01); *G06N 5/04* (2013.01); *G06N 20/20* (2019.01)

(58) Field of Classification Search
None
See application file for complete search history.

(56) References Cited

U.S. PATENT DOCUMENTS

| | | | |
|---|---|---|---|
| 10,325,222 B2 | 6/2019 | Hoover et al. | |
| 10,339,465 B2 | 7/2019 | Steele et al. | |
| 10,692,005 B2 | 6/2020 | Lilley | |
| 10,713,565 B2 | 7/2020 | Lilley | |
| 2014/0095689 A1* | 4/2014 | Borgs | G06Q 10/06395 709/224 |
| 2015/0379426 A1 | 12/2015 | Steele et al. | |
| 2016/0155070 A1* | 6/2016 | Hoover | G06N 20/20 706/12 |

(Continued)

FOREIGN PATENT DOCUMENTS

WO    2020092810 A1    5/2020

OTHER PUBLICATIONS

Patent Cooperation Treaty (PCT), PCT International Search Report and Written Opinion issued in PCT International Application No. PCT/US2022/014703 (PCT International Filing Date Feb. 1, 2022), having a Date of Mailing of Jun. 20, 2022 (11 pgs).

(Continued)

*Primary Examiner* — Xuyang Xia
(74) *Attorney, Agent, or Firm* — Kraguljac Law Group, LLC

(57) ABSTRACT

Systems, methods, and other embodiments associated with decision tree machine learning native to a graph database are described. In one embodiment, a method includes receiving an objective property value of a training graph for a graph-native decision tree to be trained to predict; determining feasible ranges of values from the training graph; automatically generating a graph query language grammar for graph-native decision trees based on the feasible ranges; progressively evolving output decision trees in a graph query language from the graph query language grammar to generate a final decision tree that accurately predicts the objective property value; and storing the final decision tree for subsequent execution against a target graph.

20 Claims, 8 Drawing Sheets

(56) References Cited

U.S. PATENT DOCUMENTS

| | | | | |
|---|---|---|---|---|
| 2016/0188656 A1* | 6/2016 | Ekanadham | ........ | G06F 16/2379 |
| | | | | 707/755 |
| 2019/0318203 A1* | 10/2019 | Jou | ...................... | G06F 3/0482 |
| 2020/0081934 A1* | 3/2020 | Karwan | ................ | H04L 67/306 |
| 2020/0184382 A1* | 6/2020 | Fishkov | ................. | G06N 20/20 |

OTHER PUBLICATIONS

Fadila Bentayeb et al: "Decision tree modeling with relational views", arxiv.org, Cornell University Library, 201 Olin Library Cornell University Ithaca, NY 14853, May 10, 2007 (10 pgs).

Thomas Helmuth et al.; Evolving SQL Queries From Examples With Developmental Genetic Programming; 2012; pp 1-16; Dept. of Computer Science, Univ. of Massachusetts, Amherst, MA.

Oracle; PGQL 1.2 Specification / Property Graph Query Language; Feb. 20, 2019; pp. 1-79; downloaded from: https://pgql-lang.org/spec/1.2/.

Jeannie M. Fitzgerald et al.; GEML: A Grammatical Evolution, Machine Learning Approach to Multi-Class Classification; 2017; pp. 1-22; Springer International Publishing AG; downloaded from: http://www.open-access.bcu.ac.uk/4068/1/OA%20GEML-A-Grammatical.pdf.

Michael O'Neill et al.; Grammatical Evolution; IEEE Transactions on Evolutionary Computation, vol. 5, No. 4; Aug. 2001; pp. 1-10.

Leo Breiman et al.; Classification and Regression Trees (Wadsworth Statistics/Probability) 1st Edition—Chapters 2 and 8 (101 pgs), Published by Chapman & Hall/CRC on Jan. 1, 1984.

* cited by examiner

DECISION TREE NATIVE TO GRAPH DATABASE

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Decision tree learning is a supervised machine learning method used for classification and regression of categorical or numerical data that uses a decision tree as a predictive model. Decision tree learning incrementally constructs a classification or regression model as a tree of binary (if-then-else) decision rules for splitting the data training data into progressively smaller subsets until base domains or classifications are reached. The decision tree model may then be used to predict a value for target (non-training) data based on data attributes of the target data. Decision tree learning has a wide range of applications and a number of advantages that make it a popular supervised machine learning approach.

A graph database (GDB) is a widely-used type of Not-Only-SQL (NoSQL) database that overcomes the inability of a relational database to expressly describe relationships between data entities. A graph database represents and stores data using a collection of nodes—representations of data entities and their properties—and edges—representations of relationships between nodes. Graph databases are purpose-built to enable efficient use of the relationships between data entities, and are advantageously applied in systems that explore the relationships, such as fraud detection or social networking. But, machine learning approaches to data stored in graph format are unsupervised methods, rather than supervised methods, such as decision tree learning.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
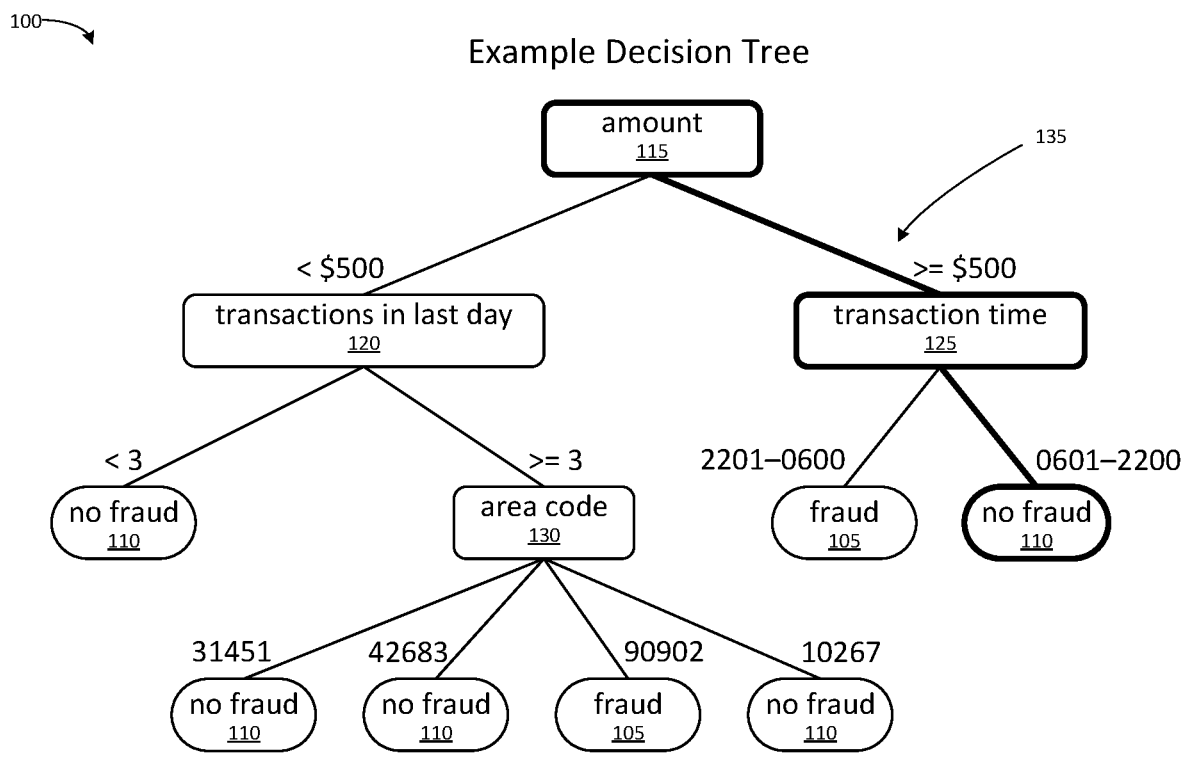
FIG. 1 illustrates a simple example of a standard decision tree.

Systems and methods are described herein that provide decision tree machine learning native to a graph database. Decision tree machine learning native to a graph database may be referred to herein as "graph decision tree learning." In one embodiment, systems and methods described herein provide a framework for constructing machine learning decision trees on graph-structured data. Implementing a framework for decision tree machine learning native to a graph database enables logic of a machine learning decision tree to be executed on graph-structured data more efficiently, with less processor and memory overhead. Implementing a framework for decision tree machine learning native to a graph database also enables extension of decision tree logic to filter on conditions related to the explicit (or express) relationships of graph-structured data records.

No action or function described or claimed herein is performed by the human mind. An interpretation that any action or function can be performed in the human mind is inconsistent with and contrary to this disclosure.

Machine learning efforts in the graph database space have focused on unsupervised learning. Graph data is conducive to unsupervised learning. Unsupervised machine learning algorithms for graph data are used for "global" application to graph data, as unsupervised machine learning algorithms decompose entire graphs. Unsupervised learning is useful for detecting previously undetected patterns in graph data, for example in social networking applications.

For learning normal activity patterns and detecting deviations from that activity, such as in fault detection and fraud detection, supervised learning is needed. For example, financial sector entities use standard decision tree learning to complement Anti-Money Laundering (AML) scenarios (deterministic rules representing a known or documented suspicious activity) as well as to integrate new information. But, these supervised learning operations act on representationally-stored data. Graph data has not been conducive to supervised learning.

Concepts used in relational databases do not necessarily translate to graph data. For example, Eigenvalue methods for PageRank do not carry over to graph data. Instead, PageRank functionality needed to be reconstructed in a graph-native way. Similarly, concepts from supervised learning on relational databases do not necessarily carry over to graph databases. In particular, attempting to apply standard decision tree learning (as applied to relational databases) results in incorrect and infeasible ranges of values. The systems and methods described herein are the first supervised learning approach native to a graph databases. In one embodiment, the systems and methods herein learn a set of conditions (the tree) that lead to efficient labeling of nodes or edges in a graph. Note, "native" software or data formats are those designed to run on a particular platform. The graph decision tree is thus "native" to a graph database in that it is designed to take advantage of the particular properties of graph-structured data in a graph database, in particular the ability to incorporate queries based on path expressions using a "match" clause.

In one embodiment, the systems and methods described herein read in a graph (graph-formatted data) and narrows down feasible ranges of values. The systems and methods described herein then conduct a global, non-gradient based search to progressively find more and more accurate predictions of the labels of the nodes and/or edges.

In one embodiment, the systems and methods described herein encapsulates logic of a standard decision tree (for node only data) and further extends the logic of the decision tree to explore and filter on relationship-related information (such as path expressions) of the graph. Advantageously, in one embodiment, the systems and methods described herein are thorough, and undertakes a deep search over all feasible relationship patterns (path expressions). The deep search is a local, gradient-based search.

In one embodiment, the systems and methods described herein are implemented in a code library (such as a Java library) on top of a graph database (such as Oracle® Graph Database). All graph databases may be improved by implementation of the systems and methods described herein.

Property graph query language (PGQL) is an extension, or superset, of structured query language (SQL), and is a SQL-like query language for interacting with graph data structures. PGQL additionally allows for matching graph patterns of fixed or variable length. Much as PGQL extends SQL, in one embodiment, graph decision tree learning extends standard decision tree learning to operate with graph data.

Any decision tree, whether a standard decision tree or a graph decision tree created in accordance with the systems and methods described herein, can be perfectly represented by a query or set of queries. For a standard decision tree, the decision tree may be represented by one or more SQL queries. For a graph decision tree, the decision tree may be represented by one or more PGQL queries. After solving, the decision tree can be stored as a string for future use.

One example decision tree using SQL is shown here in Table 1:

TABLE 1

|  | 05 10 15 20 25 30 35 40 45 50 55 |
|---|---|
| 01 | SELECT * |
| 02 | FROM adult |
| 03 | WHERE (((((education_num >= 10) AND (marital_status = |
| 04 | 'Married-civ-spouse')) OR (education_num >= 15)) |
| 05 | AND (age>=28)) OR (capital_gain > 4787)) |
|  | 05 10 15 20 25 30 35 40 45 50 55 |

In a standard decision tree, such as is represented in the example solution above, the operative clause is a 'WHERE' clause. In a graph decision tree, both the 'WHERE' clause and a 'MATCH' clause are jointly operative.

In both cases, the 'SELECT' clause may also—for simple situations—act as the objective function itself. For example, to minimize a cost column, the 'SELECT' clause may be: "SELECT SUM (cost) . . . ." In another example, for post-processing of the objective function, the 'SELECT' clause may be: "SELECT * . . . " such as is indicated in the example solution above.

FIG. 1 shows a simple example of a standard decision tree 100.

Example standard decision tree 100 predicts whether a transaction should be classified as fraudulent 105 or not fraudulent 110 based on various data attributes of the transaction, including transaction amount 115, number of transactions in the last day 120, transaction time 125, and transaction area code 130.

Interaction with a standard decision tree can be performed with SQL. For example, the transactions classified as not fraudulent by the rightmost branch 135 (shown in bold) of the example standard decision tree 100 may be retrieved from a data table "theTable" with the following example SQL command shown in Table 2:

TABLE 2

|  | 05 10 15 20 25 30 35 40 45 50 55 |
|---|---|
| 01 | SELECT * |
| 02 | FROM theTable |
| 03 | WHERE amount > 500 |
| 04 | AND transaction_time = 0601-2200 |
|  | 05 10 15 20 25 30 35 40 45 50 55 |

In one embodiment, a SQL BETWEEN operator could also be substituted for the transaction_time range in line 04 above.

Interaction with a standard decision tree can also be performed with PGQL. In one embodiment, a simple graph decision tree extension is applied to the example standard decision tree 100. The transactions classified as not fraudulent by the rightmost branch 135 (shown in bold) of the example standard decision tree 100 may be retrieved from a data graph "theGraph" with the following example PGQL command shown in Table 3:

TABLE 3

|  | 05 10 15 20 25 30 35 40 45 50 55 |
|---|---|
| 01 | SELECT * |
| 02 | FROM theGraph |
| 03 | MATCH (v) -[e]- ( ) |
| 04 | WHERE e.amount > 500 |
| 05 | AND e.transaction_time = '0601-2200' |
|  | 05 10 15 20 25 30 35 40 45 50 55 |

The logic of the example PGQL command and the logic of the example SQL command are the same. However, the PGQL command includes the 'MATCH' clause at line 03.

In one embodiment, graph decision trees extend the functionality of standard decision trees. In one embodiment, graph decision trees enable filtering on both nodes and edges due to the interaction of the "MATCH" and "WHERE" clauses. In one embodiment, further consideration of the characteristics of the vertex of a node may be incorporated into a graph decision tree. In one single branch example, only the "WHERE" clause is modified, as shown in the following example PGQL command shown in Table 4:

TABLE 4

|  | 05 10 15 20 25 30 35 40 45 50 55 |
|---|---|
| 01 | SELECT * |
| 02 | FROM theGraph |
| 03 | MATCH (v) -[e]- ( ) |

TABLE 4-continued

| | |
|---|---|
| 04 | WHERE e.amount > 500 |
| 05 | AND e.transaction_time = '0601-2200' |
| 06 | AND v.country = 'Venezuela' |

In the example given in Table 4, transactions in example data graph "theGraph" that are classified as not fraudulent may be further filtered by the initiating country—in this case, Venezuela—of the initiating node (v) of the transaction.

In in another single branch example, both the "WHERE" clause and the "MATCH" clause are modified, as shown in the following example PGQL command shown in Table 5:

TABLE 5

| | |
|---|---|
| 01 | SELECT * |
| 02 | FROM theGraph |
| 03 | MATCH (v1) -[e1]-> (v) -[e2]-> (v1) |
| 04 | WHERE e1.amount > 9000 AND e2.amount < 9000 |
| 05 | AND e1.transaction_time = '0601-2200' |
| 06 | AND e2.transaction_time = '0601-2200' |
| 07 | AND v.country = 'USA' |
| 08 | AND v1.country = 'Russia' |

In the example given in Table 5, transactions in example data graph "theGraph" that are classified as not fraudulent may be further filtered both by a specific matching pattern—the account node (v) has both received an incoming transaction [e1] from an other account node (v1) and sent an outgoing transaction [e2] to that same other account node (v1)—and by a combination of specific factors of the nodes and edges. In particular, the factors in the where clause are that the amount of the incoming transaction [e1] is greater than $9000, while the amount of the outgoing transaction [e2] is less than $9000, both transactions occur during the business day between 6:01 AM and 10:00 PM, and where the account node (v) is a US account and the other account node is a Russian account.

Note that while many examples described herein may be applied to classifying suspicious financial transactions in the field of anti-money laundering, the systems and methods herein are broadly applicable to classifying nodes in a target graph (graph-formatted data set) in any field.

In one embodiment, the systems and methods herein may be used to generate a trained graph-native machine-learning decision tree. In one embodiment, the objective function is designed to predict optimally across all rows. In one embodiment, the rows are the nodes of a graph. In one embodiment, the rows may also include the edges of the graph, in the case that a given node may have good or bad (or high or low) values for different edges.

Complementary queries across the various branches ensure coverage of all rows. For example, using "v" as alias for a table name, complementary SQL queries for a country variable stored in column1 of the table may be ... WHERE v.column1='USA'; ... WHERE v.column1 !='USA'.

In another example, complementary PGQL queries (ignoring the "MATCH" clause for simplicity) for 2 variables may be ... WHERE v.column_i>100 AND e.column_k='small_bank';
... WHERE v.column_i<100 AND e.column_k='small_bank';
... WHERE v.column_i>100 AND e.column_k !='small_bank';
... WHERE v.column_i<100 AND e.column_k !='small_bank'.

In one embodiment, the results of the graph-native decision tree may be computed directly by query. For example, each branching node or leaf node in the graph-native decision tree may be expressed by a query. This query expression captures the learned logic of the graph-native decision tree for classifying a set of one or more nodes (or edges) in a target graph. Advantageously, this query enables in-database execution of the graph-native decision tree, without requiring the additional memory and input/output burdens of a special-purpose programming language and environment, such as Oracle® Machine Learning for R (OML4R). In a further advantage, because the genetic evolutionary search to generate the graph-native ML decision tree is conducted as a string, it is perfectly scalable for larger data sets.

Computation of the results of the graph-native ML decision tree by direct query also makes the graph-native decision tree capable of deep traversal of possible solutions. This ability to explore without constraints using a deep search (assuming large sample size) enables exceptional performance in predictive accuracy by the graph-native ML decision tree. The path expressions (sequences of nodes and edges describing relationships of nodes in a target graph) made accessible by the use of the MATCH clause are diverse, and go far beyond the simple examples shown in Tables 3, 4, and 5 above.

The development for a graph-native decision tree is straightforward. A grammatical evolution is used to parse the syntax of PGQL and conduct the search by an evolutionary method. Note that this grammatical evolution of a graph-native decision tree is slower to execute with direct mathematical induction of PGQL strings than the generation of a standard decision tree. For example, the grammatical evolutionary search to generate the graph-native decision tree may be slowed by performing combinatorial optimization on the MATCH clause. Also, the grammatical evolutionary search to generate the graph-native decision tree may be slowed by the fact that in the graph-native context, the system is solving for two clauses, MATCH and WHERE, instead of only a WHERE clause in the context of relational systems. In one embodiment, a graph-native decision tree for a given target graph (dataset) is generated on the order of 30 minutes using commodity hardware, in this case a Linux virtual machine (VM) on a laptop computer, while a standard decision tree for the given target graph is generated in seconds using the same equipment. The basic commodity hardware illustrates the comparative complexity of evolving a graph-native ML decision tree over a standard decision tree. Performance can be improved in a parallel computing environment. Evolutionary search is an ideal application for parallel computation. Accordingly, the graph native ML decision tree can be obtained more rapidly using parallel computing hardware. For example, performing the grammatical evolution in a cloud computing system including 8 cores compared to the 2 cores available to the VM on the commodity hardware results in significant performance increase. This one-time cost of grammatically evolving the graph-native ML decision tree is far outweighed by the advantages of the graph-native decision tree, such as for example the ability to directly consider the paths linking nodes of the target graph. Also, the discrete and non-convex nature of searching the paths using a MATCH clause (a graph-specific situation not present in relational data representation) means that there is no good gradient-based (faster) approach. In short, no faster solution is feasible that actually searches on a basis of the graph-native path feature. Meanwhile, the evolutionary search will always yield the best result if allowed to operate for enough generations, whereas a gradient-based method, even if it were feasible, is not guaranteed to find the best result.

In one embodiment, splitting in the generation of the graph-native decision tree should remain consistent from an information theory point of view. In one embodiment, maintaining consistency in identifying splits for the graph-native decision tree from a target graph data set involves (1) branching out single conditions at a time (that is, making a Boolean split on one data column at a time); and (2) keeping the sample sizes of splits balanced (that is, the splits should result in samples from the target graph of similar size); assuming that all other aspects are equal when making the split.

The graph-native aspect of the decision tree may cause branching one step at a time (branching out single conditions) to be awkward in some cases: The MATCH clause is effectively of equal significance statistically to the WHERE clause in a graph-native ML decision tree expressed as a PGQL query, but the WHERE clause cannot exist independently of the MATCH clause in the query, while the MATCH clause does not require a WHERE clause to be in the query. But, it is natural to search for updates to the MATCH clause in a manner that is not independent from updates to the WHERE clause.

In one embodiment, greedy small graph-native decision trees are advantageous where the sample size of labeled nodes is small. This can avoid the disadvantages of dimensionality, given the potential depth of MATCH expressions.

Also, pruning for graph-native decision trees (to remove sections of the tree that are non-critical or redundant to classify instances) should be handled properly for the single tree global optimum. While a tree that is too large risks overfitting the training data with attendant poor handling of new samples, it is not natural to prune variations in MATCH expressions in the context of a graph-native decision tree. Proper methods for multi-branch pruning are not settled even for standard decision trees, and the potential for overfitting due to multi-branch pruning is amplified in a graph-native ML decision tree. The deeper the MATCH clause in the query expressing the graph-native tree, the narrower the potential for branching will be. One way to guard against overfitting in a standard decision tree is to apply a relative criterion based on the concept of the Gini Coefficient—a measure of statistical dispersion that represents inequality among values of a frequency distribution as a percentage—that penalizes splits for being imbalanced. For example, if the decision tree split a group with 80% of members placed on one side of the split, and 20% of members placed on the other side of the split, the split would be penalized, while if the decision tree split the group so that 50% of members were on each side of the split, the split would not be penalized. The Gini approach is completely heuristic and is done to block criticism of overfitting in standard decision trees. But, for the graph-native decision tree, the Gini approach hampers performance in both accuracy and efficiency, and likely amounts to an excessive constraint to apply beforehand. In one embodiment, pruning for graph-native ML decision trees should not penalize splits based on imbalance. The improved performance realized by ignoring imbalance in splits may be worth the slight risk of some overfit. Note that most pruning methods for multi-branch trees are done ex ante—based on the predictive value of a branch—and remove branches that have little predictive value for simplicity. Pruning methods that remove branches with little predictive value are generally appropriate for graph-native ML decision trees as well as for standard decision trees.

In one embodiment, processes developed for regular relational tables implemented in SQL can be transferred naturally into PGQL implementation of standard decision trees. In one example, a preliminary single-branch standard decision tree for target table of golden data for predicting that a Suspicious Activity Report (SAR) flag should be set to true may be evolved using a genetic algorithm. Such golden data may be Artificial Intelligence Foundation (AIF) golden data available from Oracle Financial Crime and Compliance Management. The target table is TABLE_GOLDEN_DATA_OSIT, and the SAR flag is indicated in column SAR_FLG. In the example, the generated preliminary single-branch standard decision tree classifies (or predicts) that the SAR flag should be set to true when both of two Boolean flags representing two kinds of irregular behavior are set: (1) the total deposit amount clip (TOT_DEPST_AM_CLIP) occurs in the account and (2) a Benford deviation (BENFORD_DEVIATION) occurs in the account:
WHERE (((TOT_DEPST_AM_CLIP LIKE '1')) AND (BENFORD_DEVIATION LIKE '1')

This evolution took about 30 minutes (1709.983 seconds, or 28.5 minutes) when performed on an example system. This may serve as a baseline performance for such operations on the example system. The genotype for this query begins 10010100101100101110011111101111101110100 01111000110000010010000 001011100100111 . . . . The fitness of the resulting phenotype WHERE clause above for predicting that a SAR flag should be set is approximately 94% (0.9436619718309859). The generated phenotype WHERE clause is a valid statement. That is, the WHERE clause is a statement that is executable without error in the in the PGQL graph query language.

In one embodiment, a graph-native decision tree may be used to predict classifications for (and label) the nodes of a target graph. In general, a graph is represented by a pair of tables—a node table, and an edge table. Each node of the graph is represented as a row in the node table. Each edge of the graph is represented as a row in the edge table. Each of the tables has columns that describe the various characteristics of each node or edge—for example, Age, Weight, Amount, and other features of the entity represented by the node or edge. In the context of anti-money laundering suspicious activity reporting, nodes commonly represent accounts—with characteristics such as Owner, Balance, and Location—and edges commonly represent transactions— with characteristics such as Source Account, Destination Account, Amount, and Time. In one embodiment, an additional column for classification (for example, labeled "Class") may be added to the nodes. In historical or golden data used for training/evolving the graph-native decision tree, this Class column may be pre-populated with existing predictions, such as technical scenarios or by a SAR flag in the case of the AIF golden data above. Generally, most rows will have a NULL value for this Class column. The graph native decision tree may be evolved from this historical or golden data, and then applied to predict the value of Class (the classification) for un-classified (unlabeled) nodes of a target graph.

In one embodiment, risk factors may be further augmented. Due to the flexibility of the evolutionary search algorithm used to generate the graph-native decision trees, the search algorithm can be used to generate either (1) a single final graph-native decision tree that represents the true global optimum, or (2) a set of greedy smaller trees that are operated as a random decision forest. In one embodiment, sets of graph-native decision trees are represented as sets of PGQL queries. The set of PGQL queries may be evaluated (or executed) against a data set, and then the average of the results of the evaluated queries taken to be the result.

Example Environment

Figure 2:
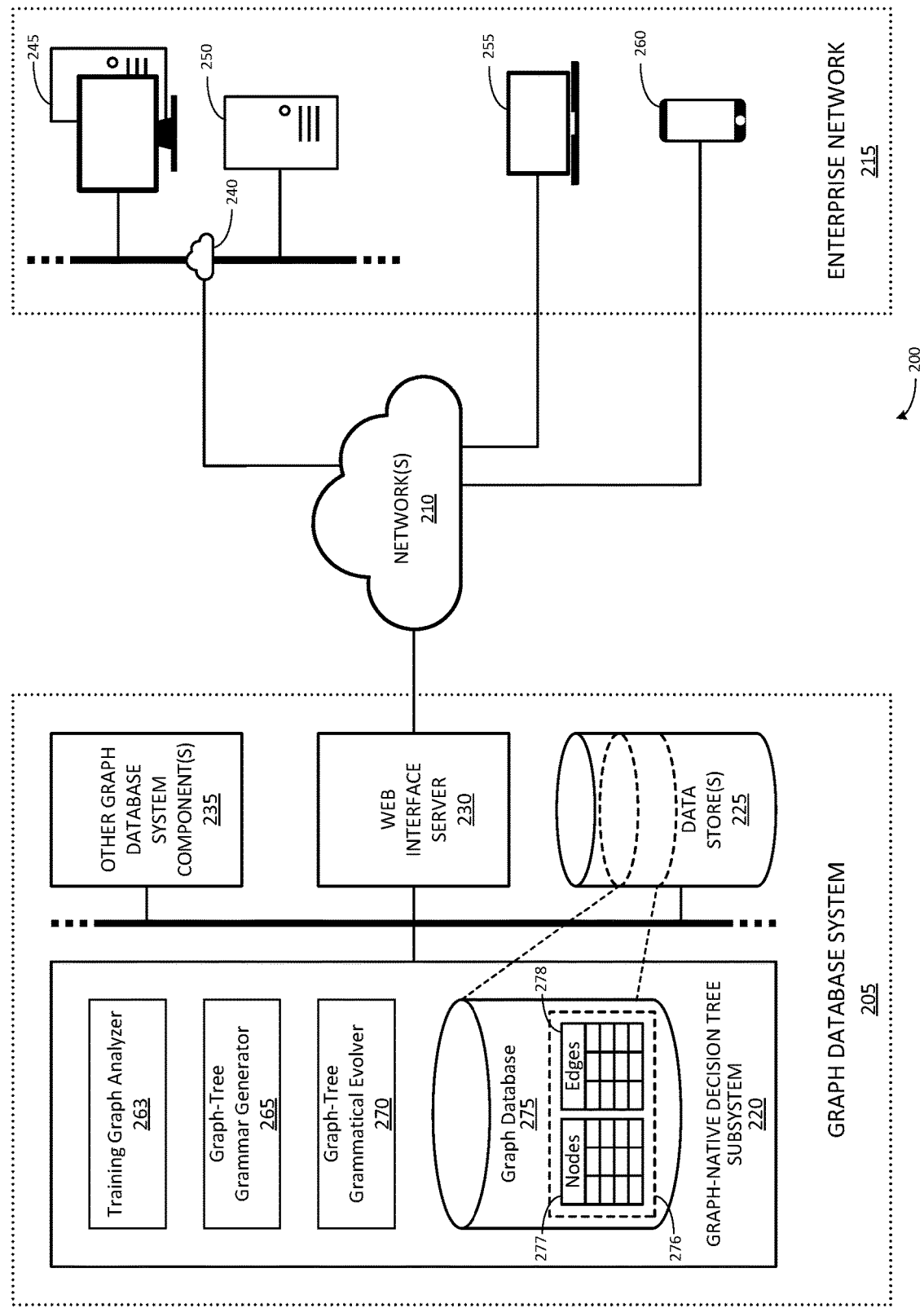
FIG. 2 illustrates one embodiment of a computing system associated with decision tree machine learning native to a graph database.

FIG. 2 illustrates one embodiment of a computing system 200 associated with decision tree machine learning native to a graph database. In one embodiment, system 200 includes a graph database system 205 connected by the Internet 210 (or another suitable communications network or combination of networks) to an enterprise network 215. In one embodiment, graph database system 205 may be an Oracle® Autonomous Database or Oracle Database implementation of a graph database. In one embodiment, cloud graph database system 205 includes various systems and components such as graph-native decision tree subsystem 220, data store(s) 225, web interface server 230, and other graph database system components 235.

In one embodiment, the components of graph database system 205 are implemented on one or more hardware computing devices or hosts interconnected by a data network. For example, the components of graph database system 205 may be executed by network-connected computing devices of one or more compute hardware shapes, such as standard (or general purpose) shapes, dense input/output (I/O) shapes, graphics processing unit (GPU) shapes, and high-performance computing (HPC) shapes. In one embodiment, the components of cloud graph database system 205 are each implemented by dedicated computing devices. In one embodiment, several or all components of graph database system 205 are implemented by a common (or shared) computing device, even though represented as discrete units in FIG. 1. In one embodiment, components of cloud graph database system 205 may be implemented across multiple computing devices.

In one embodiment, the components of graph database system 205 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Each component of graph database system 205 may parse the content of an electronic message or signal received to identify commands or requests that the component can perform, and in response to identifying the command, the component will automatically perform the command or request.

In one embodiment, graph database system 205 may be implemented as a service on cloud infrastructure. In one embodiment, graph database system 205 may be hosted by a dedicated third party, for example in an infrastructure-as-a-service (IAAS), platform-as-a-service (PAAS), or software-as-a-service (SAAS) architecture. In one embodiment, graph database system 205 may be implemented on on-premises infrastructure, such as a set of one or more dedicated servers.

In one embodiment, other graph database system components 235 include components for operating graph database system 205. For example, other graph database system components 235 may include anti-money laundering modules such as Oracle® Financial Services Crime and Compliance Studio (FSCCS); property graph database system modules such as Oracle® Spatial and Graph (OSG) or Oracle® Big Data Spatial and Graph (BDSG); property graph analytics modules such as Oracle® Property Graph AnalytiX (PGX); and/or administration modules for governing the access of tenants and users to graph database system 235.

Enterprise network 215 may be associated with a business. For simplicity and clarity of explanation, enterprise network 215 is represented by an on-site local area network 240 to which one or more personal computers 245, or servers 250 are operably connected, along with one or more remote user computers 255 or mobile devices 260 that are connected to the enterprise network 215 through the Internet 210. Each personal computer 245, remote user computer 255, or mobile device 260 is generally dedicated to a particular end user, such as an employee or contractor associated with the business, although such dedication is not required. The personal computers 245 and remote user computers 255 can be, for example, a desktop computer, laptop computer, tablet computer, or other device having the ability to connect to local area network 240 or Internet 210. Mobile device 260 can be, for example, a smartphone, tablet computer, mobile phone, or other device having the ability to connects to local area network 240 or Internet 210 through wireless networks, such as cellular telephone networks or Wi-Fi.

Users of the enterprise network 215 may interact with graph database system 205 across the Internet 210. In one embodiment, computing systems outside of graph database system 205 (such as those of enterprise network 215) may access information or applications provided by graph database system 205 through web interface server 230. In one embodiment, the outside computing system may send requests to and receive responses from web interface server 230. In one example, access to the information or applications may be effected through use of a web browser on a personal computer 245, remote user computers 255 or mobile device 260. For example, these computing devices 245, 255, 260 of the enterprise network 215 may request and receive a web-page-based graphical user interface (GUI) for creating and using graph-native machine learning decision trees in graph database system 205. In one example, web interface server 230 may present HTML code to personal computer 245, server 250, remote user computers 255 or mobile device 260 for these computing devices to render into a GUI for graph database system 205 (including a GUI for access to functions of graph-native decision tree subsystem 220). In another example, communications exchanged between web interface server 230 and personal computer 150, server 155, remote user computers 160 or mobile device 165 may take the form of remote representational state transfer (REST) requests using JavaScript object notation (JSON) as the data interchange format for example, or simple object access protocol (SOAP) requests to and from XML servers.

In one embodiment, data stores 225 includes one or more databases configured to store and serve a broad range of information relevant to applications operating in graph database system 205. In one embodiment, the data stores 225 includes a database, such as an Oracle® database. In one embodiment, the data stores 225 includes a property graph database including one or more graphs (node and edge datasets). In some example configurations, data store(s) 130 may be implemented using one or more Oracle® Exadata compute shapes, network-attached storage (NAS) devices and/or other dedicated server device.

In one embodiment, graph-native decision tree subsystem 220 include training graph analyzer 263, graph-tree grammar generator 265, graph-tree grammatical evolver 270, and graph database 275. In one embodiment, training graph analyzer 263 is configured to execute the functions described herein with reference to method 400. In one embodiment, graph-tree grammar generator 265 is configured to execute the functions described herein with reference to method 500. In one embodiment, graph-tree grammatical evolver 270 is configured to execute the functions described herein with reference to method 600. In one embodiment, graph database 275 includes one or more graphs 276 (datasets in graph format), such as training graphs, and target (non-training) graphs. The graphs 276 each include two tables: a table of nodes 277 and a table of edges 278 between the nodes. The table of nodes 277 includes a row describing each node with a unique identifier and various properties of the node. The table of edges 278 includes a row describing each edge (or relationship) between a pair of nodes with a unique identifier, an identifier of a first node and a second node between which the edge exists, and various properties of the edge.

Each of the components (including sub-components) of property graph database is configured by logic to execute the functions that the component is described as performing. In one embodiment, the components of property graph database may each be implemented as sets of one or more software modules executed by one or more computing devices (such as hosts of the cloud network computing system) specially configured for such execution. In one embodiment, these modules include one or more modules for implementing the features shown and described herein.

Example Method

In one embodiment, each step of computer-implemented methods described herein may be performed by a processor (such as processor 810 as shown and described with reference to FIG. 8) of one or more computing devices (i) accessing memory (such as memory 815 and/or other computing device components shown and described with reference to FIG. 8) and (ii) configured with logic to cause the system to execute the step of the method (such as graph-native ML decision tree logic 830 shown and described with reference to FIG. 8). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 815, or storage/disks 835 of computing device 805 or remote computers 865 shown and described with reference to FIG. 8).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Figure 3:
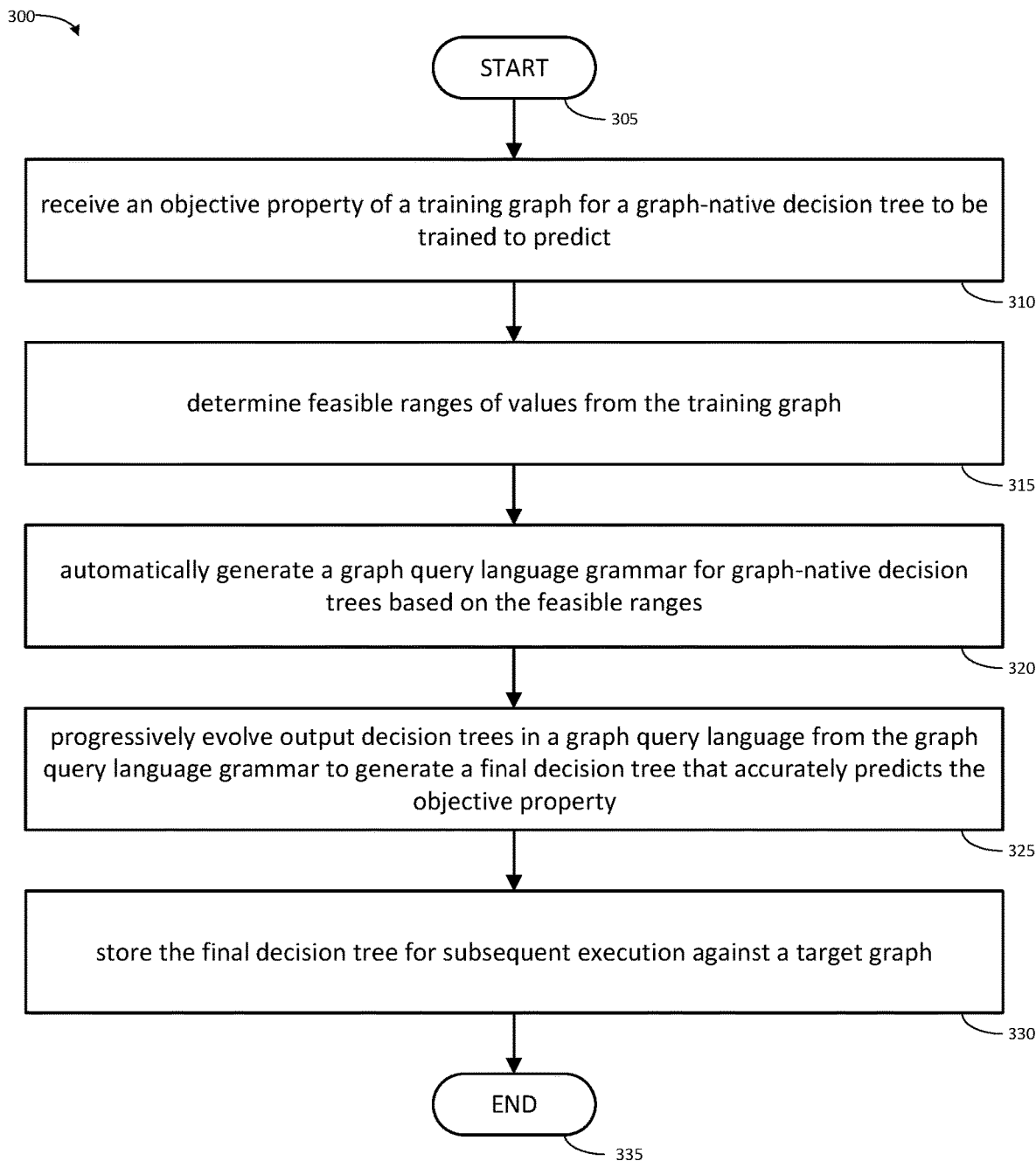
FIG. 3 illustrates one embodiment of a method associated with training a machine learning decision tree that is native to a graph database.

FIG. 3 illustrates one embodiment of a method 300 associated with training a machine learning decision tree that is native to a graph database. In one embodiment, the steps of method 300 are performed by graph-native decision tree subsystem 220 (as shown and described with reference to FIG. 2). In one embodiment, graph-native decision tree subsystem 220 are a special purpose computing device (such as computing device 805) configured with graph-native ML decision tree logic 830 to execute the functions described with reference to method 300. In one embodiment, graph-native decision tree subsystem 220 are one or more modules executing the functions described with reference to method 300 in a special purpose computing device (such as computing device 805) configured with graph-native ML decision tree logic 830.

The method 300 may be initiated automatically based on various triggers, such as in response to receiving a signal over a network or parsing stored data indicating that (i) a user (or administrator) of graph database system 205 has initiated method 300, (ii) that method 300 is scheduled to be initiated at defined times or time intervals, or (iii) that a user interface for graph database system 205 has received a selection of a training graph, an objective property value, and a command to evolve or generate a graph-native decision tree. The method 300 initiates at START block 305 in response to parsing a signal received or stored data retrieved and determining that the signal or stored data indicates that the method 300 should begin. Processing continues to process block 310.

At process block 310, the processor receives an objective property value of a training graph for a graph-native decision tree to be trained to predict.

In one embodiment graph elements (that is, nodes or edges) have properties. The properties are analogous to the columns in a table, and record further features of the graph element as values for the property. In one embodiment, an objective property value is a specific value (or range of values) for a particular property that a machine learning model is trained to predict. Thus, the term "objective" property value is used in the sense of a "target" or "goal" value (or range of values) for a property of a node or edge. In one embodiment, the objective property value is one class of a set of classes used in classification. In one embodiment, the objective property value is a numerical value used in regression.

In one embodiment, the processor presents an interface (such as GUI 700) or other communication interface that is configured to accept an input specifying an objective property value. In one embodiment the interface is presented by web interface server 230. In one embodiment, the input specifies both an objective property value and a property (of an edge or node) in which the objective property value should appear. In one embodiment, the property may be selected from a dropdown menu that is automatically pre-populated with a set of properties that appear in a training graph that is selected to be used to train the graph-native ML decision tree. The processor then accepts the input that is provided to the interface and stores it as a data structure in memory or storage (such as data stores 225) for subsequent processing.

Once the processor has thus completed receiving an objective property value of a training graph for a graph-native decision tree to be trained to predict, processing at process block 310 completes, and processing continues to process block 315.

At process block 315, the processor determines feasible ranges of values from the training graph. In one embodiment, the processor determines (i) the ranges of values for each property of the elements of the training graph and (ii) an average number of edges connected to each node of the training graph.

A key challenge in applying grammatical evolution processes to graph data is that the depth of search from node to node along edges can be practically infinite, or at least very large. Further, the range of property values may also be large, especially for numerically-valued properties (as contrasted with a limited set of class-type properties). The large number of search possibilities for deep traversals of the graph with wide ranges of property values makes the graph-native decision tree induction process a very challenging problem, regardless of the search method employed. Grammatical evolution is thus a natural search method to employ, but grammatical evolution does not by itself alleviate the computational challenges faced in the general area of combinatorial optimization problems. Accordingly, the range of possible solutions should be reduced. But, uniform depth limitations imposed across all evolutionary searches can lead to poor fitting of a machine-learning decision tree, and can exclude graph-native decision tree solutions with significantly better fitness. Accordingly, the systems and methods described herein provide a more dynamic approach.

Figure 4:
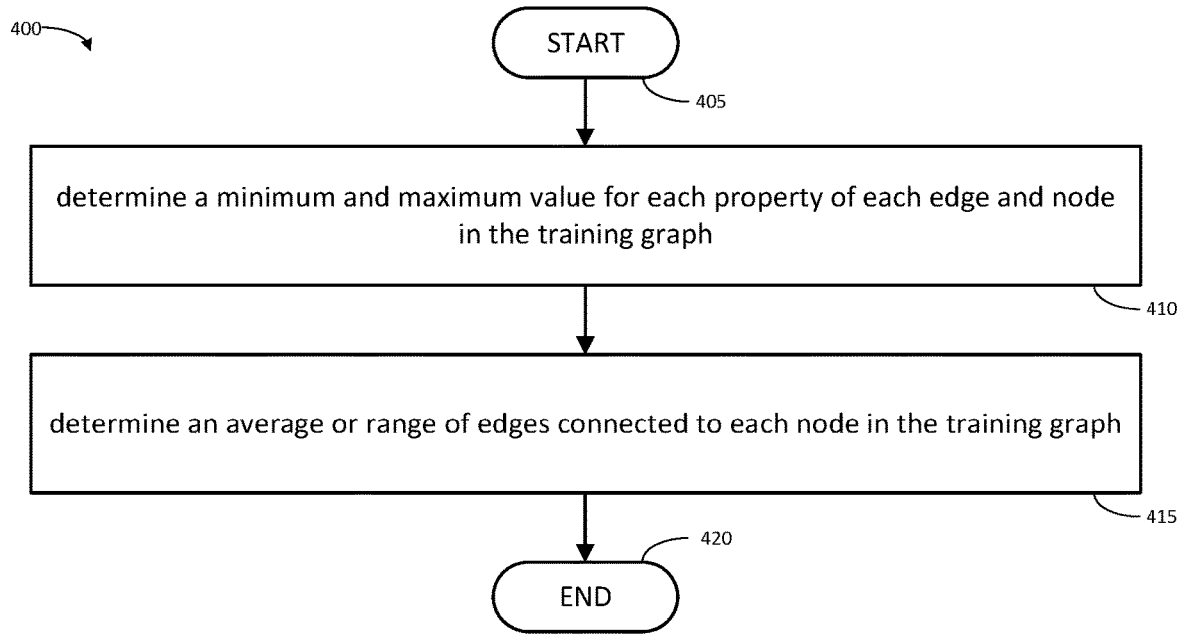
FIG. 4 illustrates one embodiment of a method for determining feasible ranges of values from a training graph, the method associated with decision tree machine learning native to a graph database.

Referring now to FIG. 4, FIG. 4 illustrates one embodiment of a method 400 for determining feasible ranges of values from a training graph, the method 400 associated with decision tree machine learning native to a graph database. In one embodiment, the steps of method 400 are performed by training graph analyzer 263, (as shown and described with reference to FIG. 2). In one embodiment, training graph analyzer 263 is a special purpose computing device (such as computing device 805) configured with graph-native ML decision tree logic 830 to execute the functions described with reference to method 400. In one embodiment, graph-native ML decision tree logic 830 is one or more modules executing the functions described with reference to method 400 in a special purpose computing device (such as computing device 805) configured with graph-native ML decision tree logic 830.

The method 400 may be initiated automatically based on various triggers, such as in response to receiving a signal over a network or parsing stored data indicating that graph database system 205 has initiated execution of an analysis of feasible ranges in the training graph, as shown and described with reference to process block 315. The method 400 initiates at START block 405 in response to parsing a signal received or stored data retrieved and determining that the signal or stored data indicates that the method 400 should begin. Processing continues to process block 410.

At process block 410, the processor determines a minimum and maximum value for each property of each edge and node in the training graph.

In one embodiment, the processor parses the training graph to determine the set of properties for the graph elements (nodes and edges) in the training graph. Note that properties may include classification labels as well as numerical properties. In one embodiment, the processor determines, for each type of property in the training graph, whether the property is numerical or a classification label.

In one embodiment, the processor generates a min-max data structure in memory or storage with a minimum field and a maximum field for each numerical type of property in the training graph. In one embodiment, the min-max data structure may be a table with columns for property (which serves as index or key), minimum, and maximum. The processor steps through or parses each graph element (node or edge) in the training graph to extract the values of each numerical property of the graph element. For each numerical property of the graph element, the processor compares the value of the property in the graph element to the minimum field and the maximum field. Where the value of the property in the graph element is less than the value in the minimum field for the property, the processor replaces the value in the minimum field for the property with the value of the property in the graph element. Where the value of the property in the graph element is greater than the value in the maximum field for the property, the processor replaces the value in the maximum field for the property with the value of the property in the graph element. Where there is not yet a value in the minimum and maximum field, the processor initializes the values of these minimum and maximum fields for each property to the first value encountered for the property in the training graph. Once the processor has processed each graph element of the training graph in this way, the minimum and maximum values for each numerical property in the training graph are stored in the min-max data structure of minimum and maximum fields for subsequent retrieval and processing.

Where the property is a classification label, rather than a numerical value, the processor gathers the set of possible labels, rather than the minimum and maximum values. In one embodiment, the processor generates a list data structure in memory or storage for each type of label property in the training graph (such as an array or table) that may be populated with labels that occur in the training graph for that label property. As the processor steps through or parses each graph element in the training graph, it also extracts the values of each label property of the graph element. Where a label value extracted for a label property of the graph element is not currently included in the list data structure for that label property type, the processor adds it to the list data structure. In one embodiment, the processor compares the extracted label value to each value already included in the list data structure. If a match is found, no action is taken. If no match is found, the processor writes the extracted label value into the list data structure in its own position, without overwriting other label values in the list data structure. Once the processor has processed each graph element of the training graph in this way, the list of possible values for each label property in the training graph are stored in the list data structure for subsequent retrieval and processing.

Once the processor has thus completed determining a minimum and maximum value for each property of each edge and node in the training graph, processing at process block 410 completes, and processing continues to process block 415.

At process block 415, the processor determines an average number of edges connected to each node in the training graph.

In one embodiment, the processor parses the edges table in the graph to identify a total number of edges connecting to each node in the graph. In one embodiment, the processor does not distinguish between incoming directed edges, outgoing directed edges, and non-directed edges when identifying the total number of edges per node. In one embodiment, the processor considers only one direction (either incoming or outgoing) and non-directed edges when identifying the total number of edges per node. The processor then calculates an average number of edges connecting each node from the counted nodes and the number of nodes. The processor saves the determined average as a data structure in memory or storage for subsequent retrieval and processing.

The identified average number of edges serves as a dynamic depth of search for the possible path expressions in grammatically-evolved MATCH statements of a graph-native ML decision tree. The average number of edges represents a maximum degree of separation between nodes that is permitted in the path expression in the generated MATCH statement. In one embodiment, the average determined by the processor is the arithmetic mean number of edges connected to each node in the graph. In one embodiment, the average determined by the processor is the median number of edges connected to each node in the graph. In one embodiment, the average determined by the processor is a number of edges that marks a transition to a top quartile or other top tile (such as a percentile). In one embodiment, a user inputs (and the processor accepts) a percentile of nodes for which their maximum possible depth (number of degrees of separation to any other node) is covered. In one embodiment, user input may occur prior to operation of method 400, for example alongside process block 310 of method 300. The processor then identifies the maximum possible depth for that percentile. For example, the user may select that 80% of nodes should be completely covered to their maximum possible depth. In this example, the processor will then determine that 80% of nodes have less than or equal to 4 degrees of separation from any other node, while the remaining top 20% of nodes may have up to 200 degrees of separation from any other node. In one embodiment, the processor parses each node of a sample to determine the edge count of the node and an average edge count (arithmetic mean of the edge count) of the node, and then finds a corresponding edge count or average edge count (maximum possible depth) that covers a user-defined percentile of the sample. In one embodiment, the sample-size and shape of the distribution may enable this maximum possible depth for the selected percentile to be estimated or derived mathematically. In one embodiment, the coverage percentile may be profiled or identified generally for through exhaustive sampling with random graphs of data. As the sample size (number of nodes in a graph) decreases, so too does the percentile. In one embodiment, the maximum possible depth may be profiled or identified more specifically for a target field of use (such as for monitoring financial transactions) through exhaustive sampling with random graphs of data for that target field of use (such as transactional data). With a coverage percentage of, for example, 80%, the remaining 20% of nodes might be too small in certain graphs for a deep path expression to be statistically supported. In standard univariate statistics, there are well-accepted but still ambiguous rules for minimum sample size, for example, at least 30 to avoid a tiny sample and at least 1068 to cap margin of error at 3% in polling. In one embodiment, for the graph-native ML decision tree, the minimum recommended cutoff number of nodes in the remaining, un-covered 20% should likely be higher than the minimum sample sizes used in polling. In either the more general or more specific case of profiling the maximum possible depth, one satisfactory heuristic considers the percentile of the maximum degrees of separation between any node in a sample against the size of the sample. In particular, the user-input percentile has a corresponding unambiguous maximum depth determined by the Weakly Connected Components (WCC) algorithm. The processor may execute the WCC algorithm for the user-input percentile on a sample graph to determine the maximum depth for that percentile in the sample graph. In one embodiment, the processor may determine the maximum possible depth for a percentile by sampling from a training graph. In one embodiment, the maximum depth for the user-input percentile of the sample graph (regardless of how the maximum depth is determined) is set by the processor to be the average number of edges. This dynamic depth handling enables more versatile evolution of graph-native ML decision trees, which results in graph-native ML decision trees with higher fitness, and further allows arrival at a final graph-native ML decision tree in fewer generations.

Once the processor has thus completed determining an average number of edges connected to each node in the training graph, processing at process block 415 completes, and processing continues to END block 420, where process 400 ends and process 300 resumes.

Referring again to FIG. 3, once the processor has thus completed determining feasible ranges of values—a range of values occurring for each property in the training graph. and an average number of edges connected to nodes in the training graph—from the training graph, processing at process block 315 completes, and processing continues to process block 320.

At process block 320, the processor automatically generates a graph query language grammar for graph-native decision trees based on the feasible ranges.

Backus-Naur form (BNF) is a syntax notation for describing grammar of a programming language. BNF grammars consist of terminals, which are items (such as literal characters or digits) that may appear in the programming language, and non-terminals, which can be expanded into one or more terminals and non-terminals. BNF grammars may be specifications for an entire programming language, or for a subset of the programming language. For example, grammars for a particular type of query—such as a decision tree query for classification—can be described in Backus-Naur form. Table 6 shows a portion of a non-recursive BNF grammar for a graph-native decision tree query written using PGQL.

TABLE 6

```
    05   10   15   20   25   30   35   40   45   50   55
01  <baseQuery> ::= MATCH <match> WHERE <where>
02    | MATCH <match>
03  <match> ::= (v0) | <baseMatch0>
04    | <baseMatch0> , <baseMatch1>
05  <baseMatch0> ::= (v0) <linkDir>-[e0_0]-<linkDir>
06    (<nodeSelect>) | (v0) <linkDir>-[e0_0]-<linkDir>
07    (<nodeSelect>) <linkDir>-[e0_1]-<linkDir>
08    (<nodeSelect>)
09  <baseMatch1> ::= (v0) <linkDir>-[e1_0]-<linkDir>
10    (<nodeSelect>) | (v0) <linkDir>-[e1_0]-<linkDir>
11    (<nodeSelect>) <linkDir>-[e1_1]-<linkDir>
12    (<nodeSelect>)
13  <where> ::= <baseWhere> | (<where>) AND <baseWhere>
14    | (<where>) OR <baseWhere>
15  <linkDir> ::= _—lt_— | _—gt_— |
16  <nodeSelect> ::= <nodeSym><nodeIds>
17  <nodeSym> ::= v
18  <nodeIds> ::= 0|1
19  <baseWhere> ::=
20    (v0.nodeProp2 <mathComp> '<valVertexnodeProp2>')
21    | (v1.nodeProp2 <mathComp> '<valVertexnodeProp2>')
22    | (v0.NodeLabel1 <stringComp> '<valVertexNodeLabel1>')
23    | (v1.NodeLabel1 <stringComp> '<valVertexNodeLabel1>')
        *
        *
        *
24    | (e0_0.edgeProp2 <mathComp> '<valEdgeedgeProp2>')
25    | (e0_1.edgeProp2 <mathComp> '<valEdgeedgeProp2>')
26    | (e1_0.edgeProp2 <mathComp> '<valEdgeedgeProp2>')
27    | (e1_1.edgeProp2 <mathComp> '<valEdgeedgeProp2>')
28  <valEdgeedgeProp2> ::= 0.01|0.32999999999999996
29    | 0.64999999999999999 | 0.96999999999999999
        *
        *
        *
30    | 31.370000000000022 | 31.690000000000023
```

TABLE 6-continued

```
31   <valVertexNodeLabel1> ::= Account|Customer
32   <valVertexnodeProp2> ::= -100|-98|-96|-94|-92|-90|-88
         *
         *
         *
33   68|70|72|74|76|78|80|82|84|86|88|90|92|94|96|98|100
34   <stringComp> ::= LIKE | NOT LIKE
35   <mathComp> ::= __gte__ | __lte__
36   <nullComp> ::= IS NULL | IS NOT NULL
        05   10   15   20   25   30   35   40   45   50   55
```

The operator "::=" In the code of Table 6 indicates that the nonterminal to the left of that operator must take the structure expressed to the right of that operator. Note that the required structure for a nonterminal may be one of multiple alternative structures with the alternatives separated by the "|" character. For example, at lines 01-02 of the code shown in Table 6, the nonterminal "<baseQuery>" must take either the form "MATCH <match> WHERE <where>" or "MATCH <match>". This indicates that any query (base query) must have a "MATCH" terminal preceding further "match" nonterminal(s) (parameter(s) for the "MATCH" statement) followed by a "WHERE" terminal preceding further "where" nonterminals(s) (parameter(s) for the "WHERE" statement), or alternatively must have a "MATCH" terminal preceding "match" nonterminals alone.

In this example, the grammar limits the queries to queries that exploring a target graph up to a depth of 3 nodes, as indicated by the set of available node identifiers at line 18, "<nodeIds>::=0|1|2|3". This depth may be adjusted (by adding or removing node identifiers, but a minimum of at least one node (v0) is needed. The node depth caps the complexity of the path expressions that may be included in the "MATCH" statement.

In one embodiment, the processor automatically generates a BNF grammar for a graph-native decision tree query written using PGQL. In one embodiment, the processor automatically populates portions of a template grammar based on the feasible ranges of values identified at process block 315.

Figure 5:
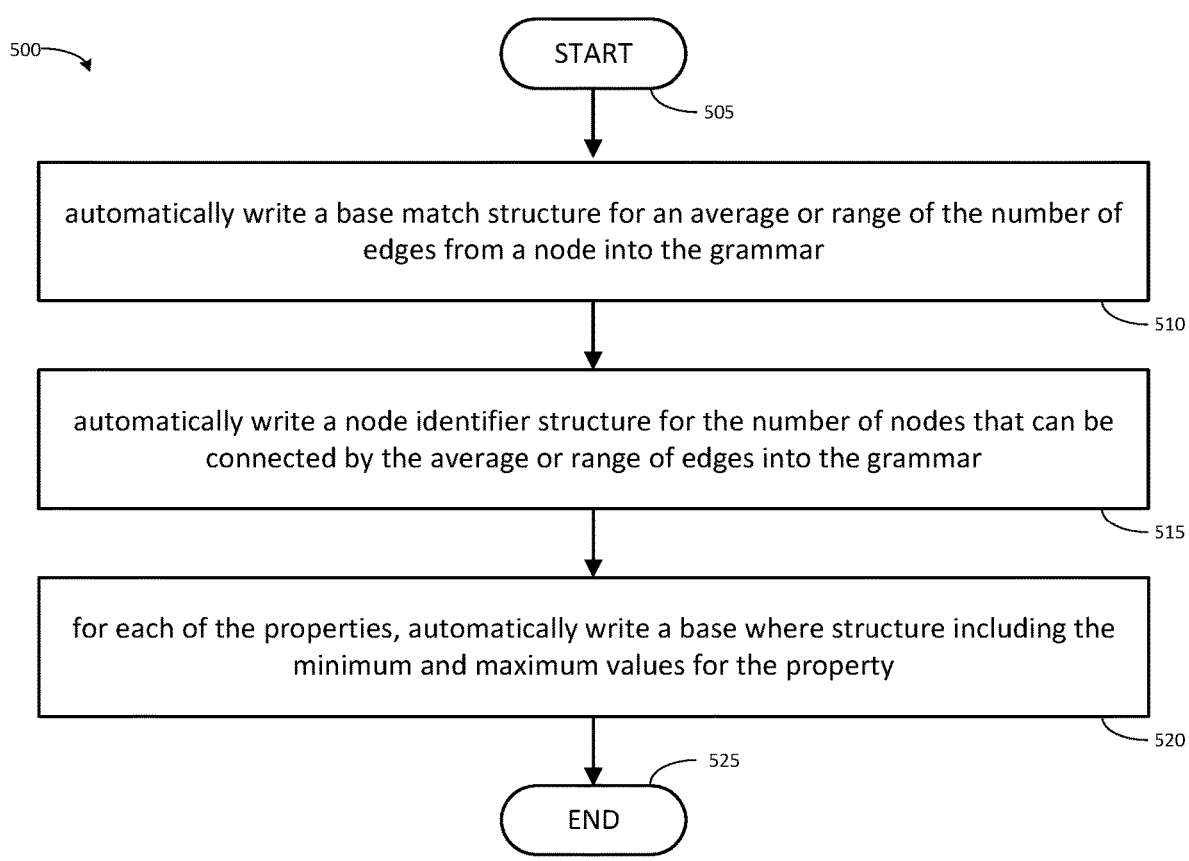
FIG. 5 illustrates one embodiment of a method for automatically generating a graph query language grammar for graph-native decision trees based on the feasible ranges, the method associated with decision tree machine learning native to a graph database.

Referring now to FIG. 5, FIG. 5 illustrates one embodiment of a method 500 for automatically generating a graph query language grammar for graph-native decision trees based on the feasible ranges, the method 500 associated with decision tree machine learning native to a graph database. In one embodiment, the steps of method 500 are performed by graph-tree grammar generator 265, (as shown and described with reference to FIG. 2). In one embodiment, graph-tree grammar generator 265 is a special purpose computing device (such as computing device 805) configured with graph-native ML decision tree logic 830 to execute the functions described with reference to method 500. In one embodiment, graph-native ML decision tree logic 830 includes one or more modules executing the functions described with reference to method 500 in a special purpose computing device (such as computing device 805) configured with graph-native ML decision tree logic 830.

The method 500 may be initiated automatically based on various triggers, such as in response to receiving a signal over a network or parsing stored data indicating that graph database system 205 has initiated automatically generating a graph query language grammar for graph-native decision trees based on the feasible ranges, as shown and described with reference to process block 320. The method 500 initiates at START block 505 in response to parsing a signal received or stored data retrieved and determining that the signal or stored data indicates that the method 500 should begin. Processing continues to process block 510.

At process block 510, the processor automatically writes a base match structure for an average of the number of edges from a node into the grammar. In one embodiment, the average serves as a limit for the number of edges allowed in the grammar.

In one embodiment, the processor dynamically generates the structure for the match statement, as well as one or more base match statements in the grammar. The processor retrieves the maximum possible depth (D) (calculated as described above with reference to process block 415) from memory or storage and then separates that number D into additive parts. The processor then adds an alternative structure for each additive part of D to the match structure in the grammar. The maximum possible depth D corresponds to the depth of the "<match>" nonterminal symbol, so D may also be given as the maximum number of edges in a single base match (MaxEdgesInBaseMatch) multiplied by the maximum number of base match nonterminals comma separated in the match statement (MaxBaseMatchesInMatch), or D=MaxEdgesInBaseMatch*MaxBaseMatchesInMatch. For example, in the example grammar shown in Table 6, lines 03-04 are dynamically generated. In this example, the maximum components to the path (the path being the sequence of nodes linked by edges) is two (MaxEdgesInBaseMatch=2), and D/2 nodes can be included in each basematch (MaxBaseMatchesInMatch=D/2), so in this simple example, D=(2*(D/2). The processor inserted two alternative base match structures into the match statement: "<baseMatch0>" and "<baseMatch0>, <baseMatch1>". The processor inserts "|" characters in advance of each alternative structure that it adds. The processor generates an alternative structure string for insertion into the match statement in the following format: "|<baseMatch0>|<baseMatch0>, <baseMatch1> . . . |<baseMatch0>, . . . , <baseMatchMaxBaseMatchesInMatch-1>", where MaxBaseMatchesInMatch corresponds to a component of one combined path. In this structure of the match statement, an alternative structure is included for each number of base matches between 1 and MaxBaseMatchesInMatch.

In one embodiment, MaxBaseMatchesInMatch (the maximum number of allowable basematches in a match nonterminal (or a maximum number of comma-separated splits in an alternative structure of the match nonterminal is preset, and static, for example by user definition, or by default to 2 (or 1 where D is less than 4). In one embodiment, MaxBaseMatchesInMatch may be inferred automatically from an edge distribution of a sample graph (such as a training graph). For example, the processor may set MaxBaseMatchesInMatch to be equal to the number of the greatest number of edges connected to a single node for a selected percentile of nodes of the sample graph. In one embodiment, the selected percentile should be the same percentile as selected for evaluating the maximum depth of nodes with the WCC algorithm. Thus for example, the processor may set MaxBaseMatchesInMatch to be higher when the number of first degree connections (direct edge between two nodes) is much higher than the number of second degree connections (one intermediate node in the path between two nodes), and the number of second much higher than third, and so on—even if, say, $100^{th}$ degree connections exist (with WCC logic being the approach that checks for this existence). In one embodiment, the maximum number of basematch nonterminal structures in an alternative <match> structure (MaxBaseMatchesInMatch) may, by default be set to 1, but this maximum may be increased when degree distribution in the sample graph is mostly first or second degree connections. For example, the increase may be linked to the skew of the degree distribution, such as skewness given by a simple skewness measure such as nonparametric skew S of the degree distribution—the mean μ of the degree distribution minus the median v of the degree distribution, divided by the standard deviation σ of the degree distribution:

$$S = \frac{\mu - v}{\sigma} \quad \text{(Eq. 1)}$$

When the skew has a high negative or positive value, the processor may increase MaxBaseMatchesInMatch, although this relationship need not be exact, and may be approximated by some simple function. In one example, MaxBaseMatchesInMatch may be increased by 1 for each 0.1 magnitude increase in the skew. Other relationships between skew and MaxBaseMatchesInMatch may be suitable, as well.

Thus, when the alternative structures are inserted into the match structure, the first alternative structure has a first base match nonterminal symbol, the second alternative structure has the first base match nonterminal symbol and a second base match nonterminal symbol, and so on until the MaxBaseMatchesInMatch-th alternative structure is reached, which will include base match nonterminal symbols for each number between 1 and MaxBaseMatchesInMatch, inclusive. Comma terminal symbols are used in the alternative structures of the match statement (such as at line 04 of Table 6) to split up particularly long, awkward paths represented by the base match nonterminal symbols. The <baseMatch> multiplicity in the grammar serves to allow the primary node (v0) to be more central to the path, and not just serve as the root of the path. This speeds the grammatical evolutionary search using the dynamically generated grammar in most cases, except where the ultimate solution has crucial information about a node further away from the primary node than is allowed when the primary node is not the root of the path.

In one embodiment, the processor dynamically generates the structures for the multiple possible base match statements in the grammar. The processor dynamically generates and inserts into the grammar a set of alternative structures for each of E base match non-terminal symbols. For example, in the example grammar shown in Table 6, lines 05-12 are dynamically generated. As discussed above, in this example the number of edges connected to a node for a given percentile of nodes (also the maximum number of edges in a single base match MaxBaseMatchesInMatch) is 2, and the processor has generated two base match nonterminal symbols, "<baseMatch0>" and "<baseMatch1>". The processor then dynamically generates sets of alternative structures for each of these base match nonterminal symbols. The processor develops alternative structures that explore different depths of graph traversal up to a maximum depth. In one embodiment, the maximum depth of graph traversal is dynamically set by the processor to be the maximum possible depth (degrees of separation) for a user-selected percentile of nodes in the training graph, as discussed above. In the example of Table 6, the maximum depth of graph traversal (D) for matches is set to 2. Accordingly, the alternative structures for the base match nonterminal symbols explore matches that go up to a depth of 2 edges away from the original node. For example, the alternative structures for the <baseMatch0> nonterminal symbol are (v0)<linkDir>-[e0_0]-<linkDir> (<nodeSelect>)

indicating a path expression pattern where a first node (v0) is connected to another node by a single edge e0_0—a depth of 1; and (v0)<linkDir>-[e0_0]-<linkDir> (<nodeSelect>) <linkDir>-[e0_1]-<linkDir> (<nodeSelect>)

indicating a path expression pattern where a first node (v0) connected to a second node by a first edge e0_0 is connected through the second node and a second edge to a third node—a depth of 2. The depth of graph traversal for a matching pattern is therefore advantageously arbitrary and dynamically handled. The processor inserts an alternative structure for the base match nonterminal symbol for each possible depth of traversal. In one embodiment, the processor appends to an initial string "(vX)" the string "<linkDir>-[eX_Y]-<linkDir> (<nodeSelect>)" for each value between 1 and D times to create D alternative structures for the nonterminal base match symbol. Here, D is the maximum depth of graph traversal, X corresponds to the baseMatch number and Y is an index starting at 0 for the number of edges included in the alternative structure. The processor inserts D alternative structures for each base match nonterminal symbol into the grammar. For the example of Table 6 where D=2, each of "<baseMatch0>" and "<baseMatch1>" have 2 alternative structures. Note that the total depth of traversal is the sum of depths for each base match in the match, given that the base matches are separated by commas in the match nonterminal statement in the grammar. For example, where there are 2 alternative structures, the total depth of search may be 4 where the two alternative structures both have depths of 2 (2+2=4). Or the total depth of search may be 3 where the two alternative structures have depths of 1 and 2, respectively (1+2=3).

Once the processor has thus completed automatically writing a base match structure for an average of the number of edges from a node into the grammar, processing at process block 510 completes, and processing continues to process block 515.

At process block 515, the processor automatically writes a node identifier structure for the number of nodes that can be connected by the average of the number of edges into the grammar.

Generally, all match statements have at least a starting node, for example having node ID "0". Subsequent alternative IDs may be appended based on the average number of edges connected to a node (E) in the training graph. In one embodiment, the processor appends the string "|Z" E−1 times to the 0 string to generate the alternative structures, or node ID terminal symbols, for nonterminal symbol "<nodeIds>". Here, Z is an index between 1 (or more generally, the starting node ID+1) and E−1. The processor writes the string of node ID terminal symbols into the grammar.

Once the processor has thus completed automatically writing a node identifier structure for the number of nodes that can be connected by the average or limit of the number of edges into the grammar, processing at process block 515 completes, and processing continues to process block 520.

At process block 520, for each of the properties, the processor automatically writes a base where structure including the minimum and maximum values for the property.

In one embodiment, the processor dynamically generates the structure for the base where statement. The processor retrieves the set of properties of the graph elements detected as described with reference to process blocks 315 and 410. The processor determines whether a property is a property of a node or of an edge. Note that as discussed above, properties may include classification labels as well as numerical properties. The processor determines whether the property is a classification label or a numerical property.

In one embodiment, where nodes include a numerical property, the processor automatically generates, for each possible node ID, a mathematical comparison alternative structure for the base where nonterminal symbol and writes it into the grammar. The mathematical comparison alternative structure describes a comparison between the numerical property value of the node and a non-terminal which may be resolved to a member of the range of possible values for the property in the training graph. This is repeated for each numerical property of the nodes. In the example of Table 6, nodes have a numerical property, "nodeProp2". The processor therefore dynamically generates and adds a mathematical comparison alternative structure for each of the two possible nodes (v0 and v1) in the example to the structure of the "<baseWhere>" nonterminal symbol, as shown at lines 19-21.

In one embodiment, where nodes include a label property, the processor automatically generates, for each possible node ID, a string comparison alternative structure for the base where nonterminal symbol and writes it into the grammar. The string comparison alternative structure describes a comparison between the label property value of the node and a non-terminal which may be resolved to a member of the set of labels for the property occurring in the training graph. This is repeated for each label property of the nodes. In the example of Table 6, nodes have a label property, "NodeLabel1". The processor therefore dynamically generates and adds a string comparison alternative structure for each of the two possible nodes (v0 and v1) in the example to the structure of the "<baseWhere>" nonterminal symbol, as shown at lines 19 and 22-23.

In one embodiment, where edges include a numerical property, the processor automatically generates, for each edge that appears in the generated base match statements (such as those shown at lines 05-12 of Table 6), a mathematical comparison alternative structure for the base where nonterminal symbol and writes it into the grammar. The mathematical comparison alternative structure describes a comparison between the numerical property value of the edge and a non-terminal which may be resolved to a member of the range of possible values for the numerical property in the training graph. This is repeated for each numerical property of the edges. In the example of Table 6, edges have a numerical property, "edgeProp2". The processor therefore dynamically generates and adds a mathematical comparison alternative structure for each of the four possible edges (e0_0, e0_1, e1_0, and e1_1) in the example to the structure of the "<baseWhere>" nonterminal symbol, as shown at lines 19 and 24-27.

Although not shown in the Example of Table 6, in one embodiment, edges may also include a label property, and the processor automatically generates, for each edge that appears in the generated base match statements (such as those shown at lines 05-12 of Table 6), a string comparison alternative structure for the base where nonterminal symbol and writes it into the grammar. The string comparison alternative structure describes a comparison between the label property value of the edge and a non-terminal which may be resolved to a member of the set of labels for the property occurring in the training graph. This is repeated for each label property of the edges.

In one embodiment, the processor dynamically populates the alternative structures of nonterminal symbols for numerical properties with terminal symbols that are at least the minimum value and maximum value stored in the min-max data structure for the property that was created as described with reference to process blocks 315 and 410 above. In one embodiment, the processor also dynamically populates the alternative structure with terminal symbols that are a set of values between the minimum and maximum values. In one embodiment, the processor subdivides the difference between the minimum and maximum values into one hundred increments. This enables generation of queries from the grammar for numerical properties that can be distinguished at a relatively high level of granularity. Other smaller or larger increment sizes may be selected at the discretion of the implementer of the system. In one embodiment, the processor inserts the minimum value into an empty string, followed by a "I" character, and finally inserting the maximum value at the end of the string. The processor may also insert the increment values, each followed by a "I" character between the first "I" character and the maximum value. In the example of Table 6, such alternative structures of terminal symbols spanning a range between a minimum and a maximum are shown at lines 28-30 and lines 32-33.

In one embodiment, the processor dynamically populates the alternative structures of nonterminal symbols for a label property with terminal symbols that are the labels saved in the list data structure for the label property that was created as described with reference to process blocks 315 and 410 above. The processor retrieves each label value from the list data structure, and appends the label value to an empty string, followed by a "|" character except in the case of the final label value in the list data structure. The processor then writes the string to the grammar. In the example of Table 6, nodes have a property which may have one of two label values: "Account", or "Customer". The property is represented by the nonterminal symbol "<valVertexNodeLabel1>". The processor therefore generates the alternative structures for this nonterminal symbol from the label values, as shown at line 31 of Table 6.

In one embodiment, the grammar can be extended to allow for evolution of queries that compare graph element (node and/or edge) properties on a relative basis (for example, v1.nodeProperty4>v2.nodeProperty4), instead of just on an absolute basis (for example, v1.nodeProperty4 >5). For example, the "<baseWhere>" nonterminal symbol beginning at line 19 of Table 6 may be populated by the processor with alternative structures such as "(v0.nodeProp2<mathComp> v1.nodeProp2)" in which terminal symbols for node (or edge) properties appear on both sides of the comparison nonterminal symbol. Note that permitting the grammar to allow relative comparison of graph element properties may add an additional statistical constraint to the consideration of weighing limits to the permitted depth of traversal in a MATCH statement (dynamically generated as described above with reference to process block 415). In one embodiment, the additional statistical constraint should cause the final grammar for evolving the graph decision tree to have a lower maximum depth of traversal in order to avoid excluding many nodes that do not have at least a certain number of edges.

Once the processor has thus completed for each of the properties, automatically writing a base where structure including the minimum and maximum values for the property, processing at process block 520 completes, and processing continues to END block 525, where process 500 ends and process 300 resumes.

Referring again to FIG. 3, once the processor has thus completed automatically generating a graph query language grammar for graph-native decision trees based on the feasible ranges, processing at process block 320 completes, and processing continues to process block 325.

Example Method—Grammatical Evolution

At process block 325, the processor progressively evolves output decision trees in a graph query language from the graph query language grammar to generate a final decision tree that accurately predicts the objective property value.

In one embodiment, a graph-native decision tree for predicting a property of nodes (or edges) may be expressed as a query, with branch points of the graph-native decision tree defined by predicates (conditions that can be evaluated to Boolean true or false values) included in the query. This graph-native decision tree query may be generated using a grammatical evolution process. This may be referred to as "evolving" the graph-native decision tree. The grammatical evolution process seeks to discover a query that has high fitness for retrieving (retrieves a high proportion) all nodes (or edges) in a training graph that have a selected value or class for a particular property. For example, the selected value or class may be a property of the nodes or edges in the graph. In one embodiment, the selected value or class is for the objective property value selected in process block 310.

Note that, in the context of relational databases (where a standard decision tree may be expressed in a SQL query), predicates occur only in a "WHERE" clause that specifies filters. In the graph-native decision tree described herein, predicates may occur in both a "WHERE" clause and a "MATCH" clause that specifies a graph pattern (or pattern of nodes and edges) that is to be matched. When applying the graph-native decision tree, the "MATCH" and "WHERE" clauses are evaluated together, allowing the graph-native decision tree to consider the relationships of nodes in the decision tree.

Grammatical evolution is a procedure for automatically generating computer programs, functions, or queries that have high fitness for an objective function. Grammatical evolution applies genetic operators to a series of numerical values, maps the series of numerical values to a program using a grammar of a programming language, tests the fitness of the program against the objective function, and repeats the process through a number of generations.

Figure 6A:
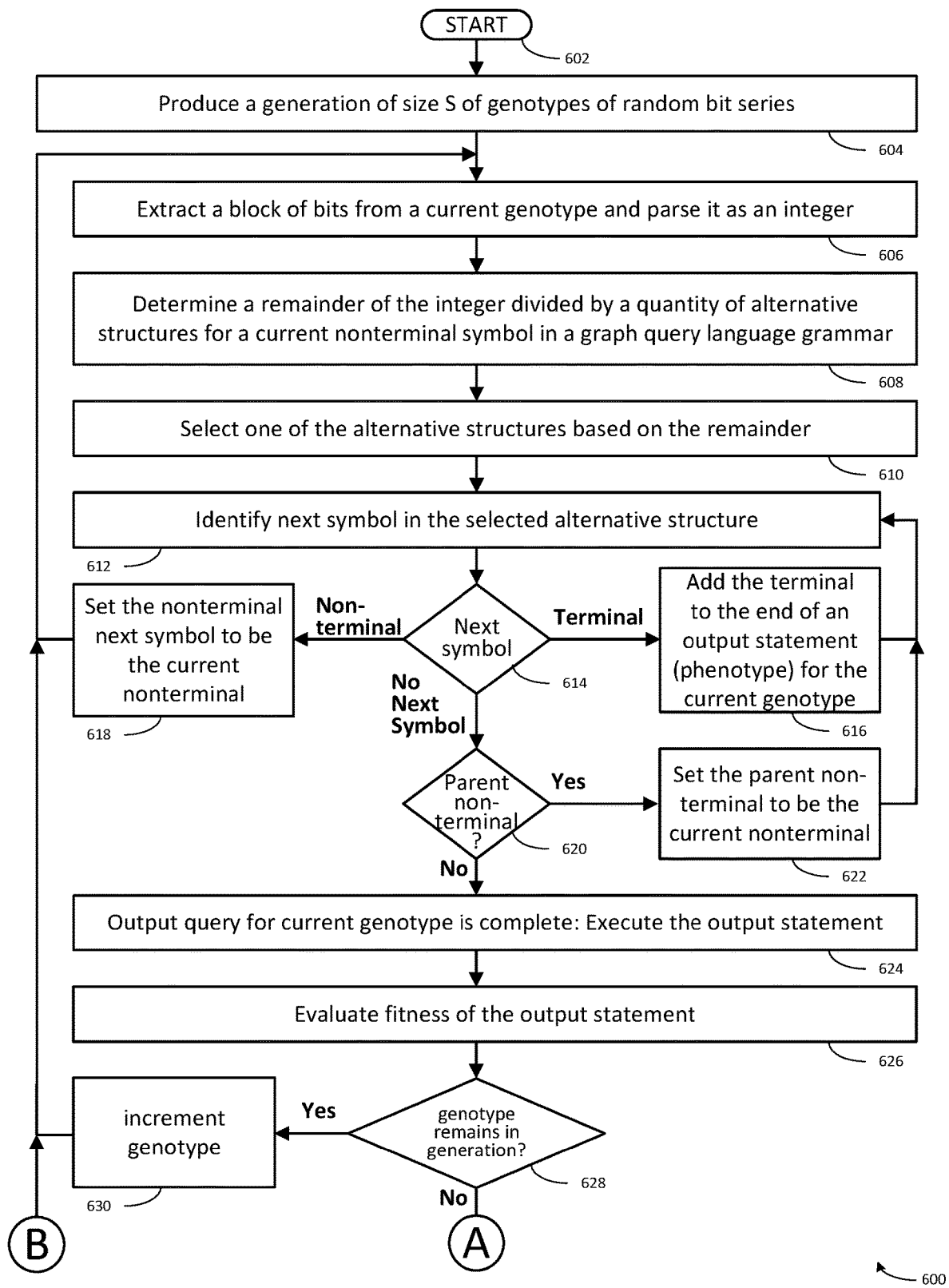
FIG. 6A illustrates a first part of a method for grammatical evolution of graph-native decision trees, the method associated with decision tree machine learning native to a graph database.
Figure 6B:
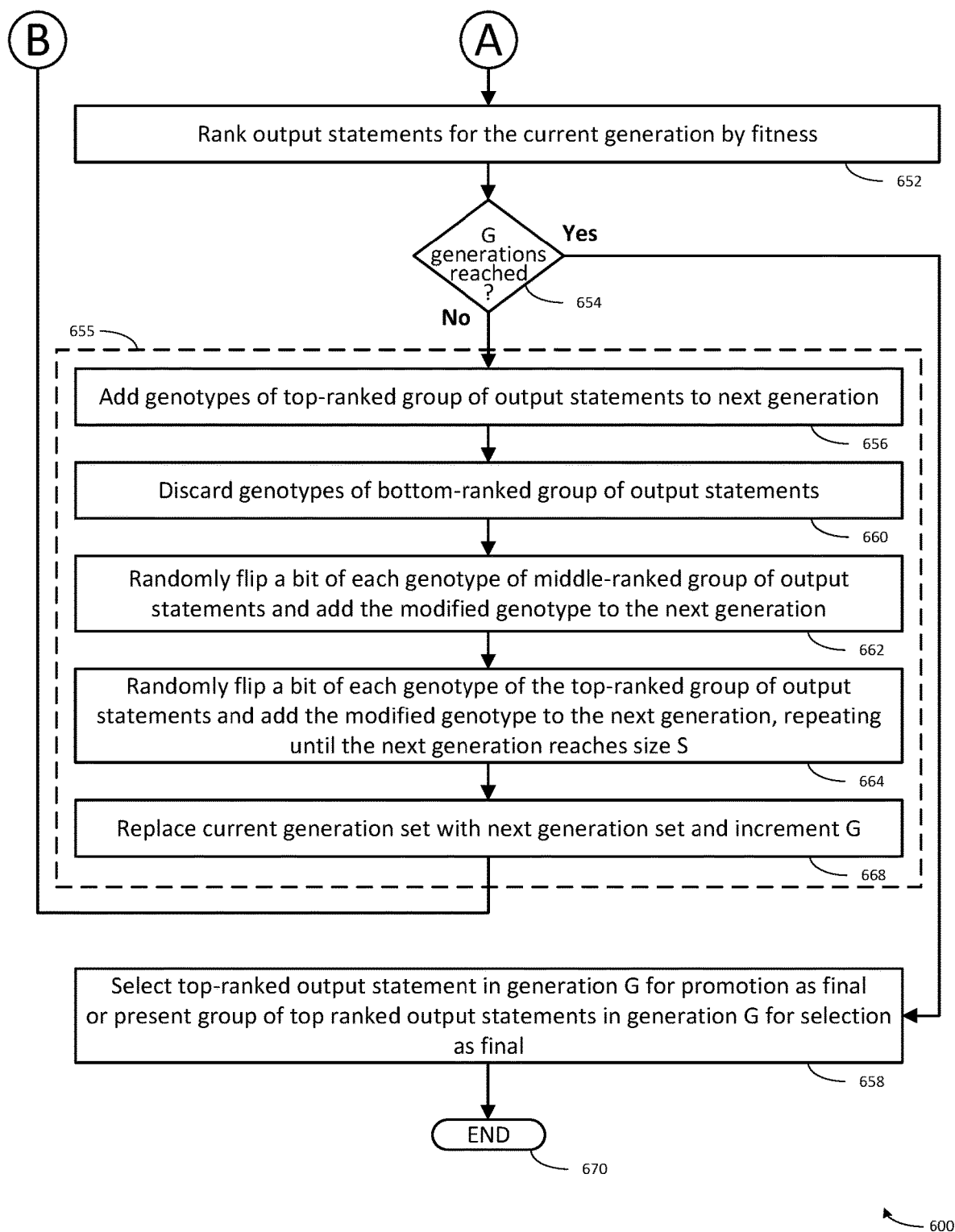
FIG. 6B illustrates a second part of the method for grammatical evolution of graph-native decision trees, the method associated with decision tree machine learning native to a graph database.

Referring now to FIGS. 6A and 6B, FIG. 6A illustrates a first part of a method for grammatical evolution of graph-native decision trees 600 and FIG. 6B illustrates a second part of the method for grammatical evolution of graph-native decision trees 600, the method 600 associated with decision tree machine learning native to a graph database. In one embodiment, the steps of method 600 are performed by performed by graph-tree grammatical evolver 270 (as shown and described with reference to FIG. 2). In one embodiment, graph-tree grammatical evolver 270 is a special purpose computing device (such as computing device 805) configured with graph-native ML decision tree logic 830 to execute the functions described with reference to method 600. In one embodiment, graph-native ML decision tree logic 830 is one or more modules executing the functions described with reference to method 600 in a special purpose computing device (such as computing device 805) configured with graph-native ML decision tree logic 830.

The method 600 may be initiated automatically based on various triggers, such as in response to receiving a signal over a network or parsing stored data indicating that graph database system 205 has initiated execution of a progressive evolution of decision trees, as shown and described with reference to process block 325. The method 600 initiates at START block 602 in response to parsing a signal received or stored data retrieved and determining that the signal or stored data indicates that the method 600 should begin. Processing continues to process block 604.

At process block 604, the processor produces an initial current generation set of genotypes of random bit series.

In one embodiment each generation of the grammatical evolution described in method 600 has a population of the same size, S. In one embodiment, the population size S for each generation is 100. Larger or smaller population sizes may also be appropriate. Larger population sizes widen the search for fit (that is, suitable) output decision trees, but increases the compute cost for executing the evolution process. As more complex grammars have a wider range of possible valid searches than simple grammars, larger population sizes are appropriate for more complex grammars. The dynamically generated grammars discussed herein are kept simpler by the step of determining feasible ranges of values from the training graph discussed with reference to FIGS. 3-5, thus reducing the need for large population sizes in the grammatical evolution. In one embodiment, the size S of the population is chosen dynamically by the processor in response to the complexity of the dynamically generated graph query language grammar, for example based on the number of nonterminal symbols in the grammar. In one embodiment, the size S of the population is predetermined by the system designers to accommodate an expected complexity of the dynamically generated grammars, and is retrieved from memory or storage by the processor.

In one embodiment, the processor generates an array (or linked list or other list-like data structure) of length S, and populates each position in the array with a series of random bits. Each of these series of bits is of the same length. In one embodiment, the number of bits available should be sufficient to express an integer value larger than the largest number of alternative structures for a nonterminal symbol in the dynamically generated grammar for each nonterminal symbol in the dynamically generated grammar. For example, if the largest number of alternative structures for a nonterminal symbol in the dynamically generated grammar is 100, and the number of nonterminal symbols is 15, the series of random bits must be at least 7 bits (the minimum number of bits needed to represent 100) times 15, or 105 bits. The processor may populate the series of bits by executing a random number generator and inserting the generated random number into the array for each of the S positions in the array. If a single generated random number does not provide sufficient bits, multiple random numbers may be appended in each position of the array to achieve the sufficient number of bits. For example, to accommodate the example 105 bits required, the processor may generate and insert 4 32-bit random integers into each position of the array. Alternatively, a genotype data type may be defined with an adequate number of bits. The processor may then execute a random genotype generator and insert the generated genotype into each of the S positions in the array.

By analogy to genetics, each of these series of bits in the array may be referred to as a genotype. The genotype—the series of bits—may be interpreted by the processor to select terminal symbols from the dynamically generated grammar to add to an output decision tree query. Again, by analogy to genetics, the output decision tree query may also be referred to as a phenotype, or an expression (in graph query language) of the traits of the grammar described by the genotype. Thus, the processor has produced an initial current generation set of genotypes of random bit series once it has generated and fully populated the array of length S with random numbers.

Once the processor has thus completed producing an initial current generation set of genotypes of random bit series, processing at process block 604 completes, and processing continues to process block 606.

In one embodiment, the processor executes process blocks 606-630 for each genotype in the current generation set.

At process block 606, the processor extracts a block of bits from a genotype and parses the bits as an integer.

In one embodiment, the processor retrieves a next available series of bits from the current genotype in the array. The retrieved series of bits, or block of bits, may be the minimum number of bits discussed above to be sufficient to express an integer value larger than the largest number of alternative structures for a nonterminal symbol in the dynamically generated graph-query language grammar. The processor may extract block of bits from the beginning of the genotype, or from the end of the genotype. After the block of bits are retrieved, the processor marks the retrieved block of bits as no longer available in the genotype, indicating that they have already been extracted.

In one embodiment, the processor may distinguish the used bits from the unused bits by incrementing a position counter for the genotype as each bit is extracted. The beginning of the next available series or block of bits in the genotype is indicated by the position counter for the genotype. For example, if the block size is 8 bits, the position counter will initially indicate the first bit in the genotype. After the first block of bits is extracted, the position counter will indicate that the second block begins at the 9th bit, and so on until all blocks have been extracted. The counter is reset to indicate the first bit of each subsequent genotype when the process moves on to the subsequent genotype.

In one embodiment, the processor may distinguish between the used and unused bits by setting a flag indicating that a bit was used for each bit in the genotype as the bit is retrieved. The processor may reset the flags to an unused state and reuse the flags for subsequent genotypes in the array when the process advances to the next genotype.

The processor then parses the retrieved series or block of bits as an integer. In one embodiment, the processor executes a function that accepts the series or block of bits, and returns the integer value indicated by those bits. The processor then stores the integer value in memory or storage for subsequent use.

Once the processor has thus completed extracting a block of bits from a genotype and parsing the bits as an integer, processing at process block 606 completes, and processing continues to process block 608.

At process block 608, the processor determines a remainder of the integer divided by a quantity of alternative structures for a nonterminal symbol in the graph query language grammar.

In one embodiment the processor counts the number of alternative structures for a nonterminal symbol in the dynamically generated graph—query language grammar. For example, the processor may parse the given structure of the nonterminal symbol to count the number of "|" characters, and add 1 to find the quantity of alternative structures for the nonterminal symbol. The processor then retrieves the integer derived from the block of bits extracted from the genotype. The processor then finds the remainder of the integer divided by the quantity of alternative structures. For example, the processor may execute the modulo operator "%" in Java implementations thus integerFromBlock % quantityOfAlternativeStructures to find the remainder. The processor then stores the remainder in storage or memory for subsequent use.

Once the processor has thus completed determine a remainder of the integer divided by a quantity of alternative structures for a nonterminal symbol in the graph query language grammar, processing at process block 608 completes, and processing continues to process block 610.

At process block 610, the processor selects one of the alternative structures based on the remainder.

In one embodiment the processor retrieves the remainder from memory or storage. The processor then selects the remainder-th alternative structure of the nonterminal symbol, with the alternatives indexed starting at 0. For example, referring to lines 13-14 of Table 6, there are three possible alternative structures for the nonterminal symbol "<where>": structure no. 0, "<baseWhere>", structure no. 1, "(<where>) AND <baseWhere>", and structure no. 2, "(<where>) OR <baseWhere>". In this case, the remainder will have been determined to be either 0, 1, or 2. If, for example, the remainder is 0, the processor selects structure no. 0. If the remainder is 1, the processor selects structure no. 1, and so on, for any number of alternative structures. The processor then records its selection in memory or storage for subsequent processing.

Once the processor has thus completed selecting one of the alternative structures based on the remainder, processing at process block 610 completes, and processing continues to process block 612.

Process blocks 612-622 serve to generate one output decision tree by inserting into an output decision tree (query) (i) the terminal symbols of the selected alternative structure (selected in process block 610), and (ii) the terminal symbols identified by resolving the non-terminal symbols as indicated by the genotype, in the order that the terminal and nonterminal symbols appear in the selected alternative structure.

At process block 612, the processor identifies a next symbol in the selected alternative structure.

In one embodiment the processor parses the selected alternative structure to identify the terminal and nonterminal symbols that make up the alternative structure. The processor handles (that is, applies the processes described below with reference to blocks 614-622) the symbols in the order that they appear in the alternative structure. The processor tracks which symbols have been handled, for example by setting a flag for each symbol or by incrementing a counter of the symbols in the alternative structure that points to the next unhandled symbol, in a manner similar to that described with reference to process block 606. The processor determines that the first unhandled symbol (after the symbols that have already been handled) in the alternative structure to be the next symbol in the alternative structure.

In one embodiment, when there are no further symbols in the alternative structure, the processor determines that the next symbol to be a null or other value indicating "no next symbol".

Once the processor has thus completed identifying a next symbol in the selected alternative structure, processing at process block 612 completes, and processing continues to decision block 614.

At decision block 614, the processor determines whether there is no next symbol, or, if there is a next symbol, whether the next symbol is a nonterminal symbol or a terminal symbol.

In one embodiment, where the grammar is written in Backus-Naur form, the processor parses the next symbol to determine whether the next symbol (i) is a null or other value indicating that there is no next symbol, and if not, (ii) whether the next symbol begins with a "<" character and ends with a ">" character.

Where the next symbol does not begin with a "<" character and end with a ">" character, the processor determines that the next symbol is a terminal symbol, and processing at decision block 614 completes and continues to process block 616.

Where the next symbol begins with a "<" character and ends with a ">" character, the symbol is a nonterminal symbol, and processing at decision block 614 completes and continues to process block 618.

Where the next symbol is a null or other value indicating no next symbol, there is no next symbol, and processing at decision block 614 completes and continues at decision block 620.

At process block 616, the processor adds the terminal next symbol to the end of an output statement for the current genotype.

In one embodiment the processor maintains an output statement for the current genotype as a data structure in memory or storage. For example, the output statement may be a string. Initially, the output statement string may be a null string. The processor retrieves the output statement string and appends the terminal next symbol to the end of the output statement string. In one embodiment, this is performed using a concatenation or append function on the output statement string and the terminal next symbol. As terminal symbols are added to the output statement string, the output statement is constructed.

Once the processor has thus completed adding the terminal next symbol to the end of an output statement for the current genotype, processing at process block 616 completes, and processing returns to process block 612 to continue for the next symbol.

At process block 618, the processor sets the nonterminal next symbol to be the current nonterminal symbol.

In one embodiment, the processor begins to resolve—reduce to all terminal symbols—a nonterminal symbol that appears in the alternative structure of another nonterminal symbol. A nonterminal symbol with a structure that includes a further nonterminal symbol may be referred to as a "parent" non-terminal symbol to the further nonterminal symbol, while the further non-terminal symbol may be referred to as a "child" of the nonterminal whose structure includes it. Every nonterminal symbol has a parent nonterminal symbol, except for the "start" symbol at the first line, which is the root parent nonterminal symbol. Nonterminal symbols other than the start or root parent nonterminal symbol will ignored in the resolving of nonterminal symbols. The processor leaves off resolving a parent nonterminal symbol, and proceeds to resolve a child nonterminal symbol. In one embodiment, the processor records the point in the structure of the parent nonterminal symbol at which the child nonterminal symbol occurs in association with the child nonterminal symbol. This may be referred to as a parent record. For nonterminal symbols that have no parent structure, the parent record is null or otherwise indicates no parent. The processor then sets the child nonterminal symbol to be the current nonterminal symbol being resolved by the system. The processor will then proceed to repeat blocks 606-622 for the child nonterminal symbol. The processor may move down through multiple layers of child nonterminal symbols until a nonterminal symbol is reached with a selected structure that includes only terminal symbols.

In one embodiment this is performed recursively. In one embodiment, this is performed by a loop.

Once the processor has thus completed setting the nonterminal next symbol to be the current nonterminal symbol, processing at process block 618 completes, and processing returns to process block to process block 606 to resolve the current (child) nonterminal symbol.

At decision block 620, the processor determines whether there is a parent nonterminal symbol to the current nonterminal symbol.

In one embodiment the processor retrieves the parent record for the current nonterminal symbol and parses it to identify whether there was a parent to the current nonterminal symbol. Where the parent record describes a parent nonterminal symbol, the processor determines that there is a parent nonterminal symbol to the current nonterminal symbol, and processing at decision block 620 completes and continues to process block 622. Where the parent record is null or otherwise indicates that the current nonterminal symbol is not included in the structure of another nonterminal symbol, the processor determines that there is no parent nonterminal symbol to the current nonterminal symbol, and processing at decision block 620 completes and continues to process block 624.

At process block 622, the processor sets the parent nonterminal symbol to be the current nonterminal symbol.

In one embodiment, the processor resumes processing the parent nonterminal symbol where it left off, following resolution of the current (child) nonterminal symbol. The processor parses the parent record for the current nonterminal symbol to determine the point in the structure of the parent nonterminal symbol at which the child nonterminal symbol occurs. The processor then sets the parent nonterminal symbol to be the current nonterminal symbol, and resumes resolving the structure of the parent nonterminal symbol at the next symbol in the structure.

Once the processor has thus completed setting the parent nonterminal symbol to be the current nonterminal symbol, processing at process block 622 completes, and processing returns to process block 612 to resume for the next symbol.

When there are no further symbols in the selected alternative structure to append to the output decision tree (query) or resolve (and in the process, append to the output query), the output decision tree (query) for the current genotype is completed. The output decision tree (query) or phenotype for the current genotype is written in the dynamically generated graph query language grammar. The processor records the created output decision tree (query) in association with the current genotype in a data structure in memory or storage, such as in a table of output decision trees (phenotypes), in which each decision tree has its own row, and the table includes columns for the output decision tree's query string, the associated genotypes used to generate the query string, and other fields, such as fields for fitness and fitness weights.

At process block 624, the processor executes the output decision tree on the training graph.

In one embodiment the processor executes the output decision tree (query) for the current genotype on the training graph to retrieve a set of graph elements (that is, nodes or edges) in the training graph that the output decision tree predicts to have the objective property value. This may be referred to herein as a set of "predicts" for the decision tree. The processor then stores these "predicts" in memory or storage for subsequent processing.

Once the processor has thus completed executing the output decision tree on the training graph, processing at process block 624 completes, and processing continues to process block 626.

At process block 626, the processor evaluates the fitness of the output decision tree.

In one embodiment, where the decision tree is used for classification, the processor compares the set of predicts with a set of actuals—a set of graph elements in the training graph that actually have the objective property value. The processor retrieves the set of actuals by executing a query to retrieve the graph elements where the property has the objective property value. The processor identifies each predict that also belongs to the set of actuals to be a true positive. The processor identifies each predict that does not belong to the set of actuals to be a false positive. The processor identifies each actual that does not belong to the set of predicts to be a false negative. These identifications may be made by writing the identified graph element and its associated identification (true positive, false positive, or false negative) to a table or other data structure in memory or storage.

The processor then counts the total number of each type of element to find the number of true positives, the number of false positives, and the number of false negatives, for example by counting the occurrence of each label in the table of elements and identifications.

In one embodiment, where the decision tree is used for classification, the fitness metric is the complement of the balanced F-score, or harmonic mean of precision and recall. The fitness metric may be expressed $$\text{fitness} = 1 - \left( \frac{truePositives}{truePositives + \frac{1}{2}(falsePositives + falseNegatives)} \right) \quad \text{(Eq. 2)}$$

or $$\text{fitness} = 1 - \frac{2 * precision * recall}{precision + recall} \quad \text{(Eq. 3)}$$

where $$precision = \frac{truePositives}{truePositives + falsePositives} \text{ and} \quad \text{(Eq. 4)}$$

$$recall = \frac{truePositives}{truePositives + falseNegatives} \quad \text{(Eq. 5)}$$

In other embodiments where the decision tree is used for classification, alternative fitness metrics may be used. In one embodiment, the processor evaluates Eq. 2 for the counts of true positives, false positives, and false negatives discovered in the comparison of the set of predicts with the set of actuals. The processor then stores the resulting fitness score in association with the output decision tree (query) in a table or other data structure in memory or storage. For example, the resulting fitness score may be stored in appropriate columns in the table of output decision trees.

In one embodiment, where the decision tree is used for regression, the processor compares the predicted values of the property in the set of predicts with the actual values of the property recorded in the training graph. In one embodiment, where the decision tree is used for regression (value prediction), the fitness metric may be based on one of the mean absolute error (MAE), root mean square error (RMSE), coefficient of determination (also referred to as $R^2$), or adjusted coefficient of determination. For example, a mean-absolute-error-based fitness metric may be expressed $$\text{fitness} = \frac{1}{1 + \left( \frac{1}{N} \sum_{i=1}^{N} |actualValue_i - predictedValue_i| \right)} \quad \text{(Eq. 6)}$$

where N is the number of graph elements (nodes or edges) of the training graph that are considered (that is, N is the size of the set of predicts). In another example, a root-mean-square-error-based fitness metric may be expressed $$\text{fitness} = \frac{1}{1 + \left( \sqrt{\frac{\sum_{i=1}^{N} predictedValue_i - actualValue_i}{N}} \right)} \quad \text{(Eq. 7)}$$

where N is the number of graph elements of the training graph that are considered. In other embodiments where the decision tree is used for regression, alternative fitness metrics may also be used. In one embodiment, the processor evaluates one of Eq. 6, Eq. 7, or another fitness metric equation (as may be pre-selected by a user, administrator, or designer of graph database system 205) for the set of N predicts. The processor then stores the resulting base fitness score in association with the output decision tree (query) in a table or other data structure in memory or storage. For example, the resulting fitness score may be stored in appropriate columns in the table of output decision trees.

In each of these fitness metrics, scores range between 0 and 1, with higher scores indicating better fitness and a score of 1 corresponding to ideal fitness.

In one embodiment, the fitness metric is a base fitness metric in addition to which additional fitness features may be considered. For example, weights may be applied to the base fitness metric to favor queries that exhibit desirable characteristics other than accuracy. In one embodiment, the weights are between 0 and 1, and may be applied to the base fitness metric by multiplication.

In one embodiment, shorter queries—that is, queries including fewer language elements rather than merely having fewer characters—may be favored over longer queries with more language elements. Shorter queries may therefore be weighted more heavily than longer queries. For example, a processor may apply a weight between 0 and 1 for length by counting the number of symbols in the output decision tree query and reducing the weight for every symbol in excess of a certain predetermined quantity. Other methods of weighting for query length may also be applied.

In one embodiment, queries that take lower computation time (for example, based on processor cycles to complete, or based on simple elapsed time to complete) to execute may be favored over queries that take higher computation time. Queries requiring lower computation time may accordingly be weighted more heavily than queries requiring higher computation time. For example, a processor may apply a weight between 0 and 1 by measuring the time taken to execute the output decision tree query (for example as performed in process block 624) and taking the reciprocal of that measured time (1/measuredTime). Other methods of weighting for computation time may also be applied.

In one embodiment, the processor may check the queries for validity for execution in the graph query language. In one embodiment, the validity check is performed before the output decision tree query is executed on the training graph. In another embodiment, the validity check is simply whether or not the output decision tree query fails when executed on the training graph. Queries that are valid are assigned a validity weight of 1, while queries that are not valid are assigned a validity weight of 0. The validity weight is then applied to the fitness metric as a multiplier. Thus, invalid queries are recorded to be completely unfit with a fitness value of 0, while valid queries are given their calculated fitness value subject to any other weights.

In one embodiment, the processor stores a weighted fitness score that incorporates all applied weights in association with the output decision tree in a table or other data structure in memory or storage. In one embodiment, the processor stores the base fitness score and one or more weights separately in association with the output decision tree in a table or other data structure in memory or storage. For example, the weighted fitness score and/or the individual weights may be stored in appropriate columns in the table of output decision trees.

Once the processor has thus completed evaluating the fitness of the output decision tree, processing at process block 626 completes, and processing continues to decision block 628.

At decision block 628, the processor determines whether a further genotype remains in the generation set.

In one embodiment the processor determines whether the processor has reached the end of the array of genotypes for the generation set by determining whether the next position in the array of genotypes is null. Where the next position in the array is not null, the processor has determined that a genotype remains in the generation set, processing at decision block 628 completes, and processing continues to process block 630. Where the next position in the array is null, the processor has determined that no genotype remains in the generation set, processing at decision block 628 completes, and processing continues to process block 652 (shown on FIG. 6B).

At process block 630, the processor increments the genotype in the generation set. In one embodiment, the processor selects the next genotype from the array of genotypes for the generation set and sets it to be the current genotype in the array. The processor resets the counter or flags indicating the number of bits extracted from the genotype to indicate that no bits have been extracted from the genotype.

Once the processor has thus completed incrementing the genotype in the generation set, processing at process block 630 completes, and processing returns to process block 606 to repeat for the next genotype in the generation set.

When there are no genotypes remaining in a generation, phenotype output decision tree queries have been generated and evaluated for fitness for the whole generation, and the process proceeds to process block 652. At process block 652, the processor ranks the output statements for the current generation by fitness. In one embodiment, the processor sorts the rows of the table of output decision trees by the fitness score. In one embodiment, the processor sorts the rows of the table of output decision trees by the weighted fitness score. This sorting may be accomplished by executing one of a variety of common sorting algorithms.

Once the processor has thus completed ranking the output statements for the current generation by fitness, processing at process block 652 completes, and processing continues to decision block 654.

At decision block 654, the processor determines whether a predetermined number of generations have been evaluated. In one embodiment, the number of generations is user-specified.

As with population size, a higher number of generations broadens the search for output decision trees with high fitness. Where there are more complex grammars, a higher number of generations may be appropriate. As mentioned above, the dynamically generated grammars herein are constrained to remain relatively simple, so as few as 50 generations may be sufficient to evolve reasonably good queries. 100 generations is a suitable default number of generations in for the particular evolution described herein, although higher numbers of generations may be chosen at the discretion of the user.

In one embodiment, the processor determines whether a predetermined, "sufficient" number of generations G has been reached. In one embodiment, the processor may increment a generation counter in each generation until it reaches the predetermined G. The processor compares the value of the generation counter to the value of G to determine if it has been reached. Where the predetermined number of generations G has not been reached, processing at decision block 654 completes, and processing proceeds to process block 656. Where the predetermined number of generations G has been reached, processing at decision block 654 completes, and processing proceeds to process block 658.

One embodiment of a series of genetic/evolutionary operations 655 is applied to the genotypes in the generation set to produce a subsequent generation set, shown and described with reference to process blocks 656, 660, 662, 664, and 668. In one embodiment, other sequences of genetic operations for producing a subsequent generation set may also be employed.

At process block 656, the processor add genotypes of a top-ranked subset of the output decision trees to a next generation set.

In one embodiment, the top ranked subset includes the top 2% of output decision trees (by fitness, weighted or unweighted), although other percentages within 5% of the top may also be appropriate. The processor identifies each of the members of the top ranked subset in the table of output decision trees. The processor retrieves the genotype of each of the members of the top ranked subset and inserts it into a new array of genotypes for the next generation set. This ensures that the genotypes for output decision tree queries that have high fitness are retained in subsequent generations for competition against other genotypes.

Once the processor has thus completed adding genotypes of a top-ranked subset of the output decision trees to a next generation set, processing at process block 656 completes, and processing continues to process block 660.

At process block 660, the processor discards genotypes of a bottom-ranked subset of the output decision trees.

In one embodiment, the bottom ranked subset includes the bottom 30% of output decision trees (by fitness, weighted or unweighted), although other percentages within 50% from the bottom may also be appropriate. Also, where validity is included in the weighted fitness metric, any output decision trees with a fitness score of 0 is included in the bottom ranked subset, regardless of whether it causes the bottom ranked subset to exceed 30% (or other user-selected percentage). In one embodiment, the processor identifies each of the members of the bottom ranked subset in the table of output decision trees, and does not insert their genotypes into the new array for the next generation set. This ensures that output decision tree queries that are invalid or result in poor fitness are not reproduced in subsequent generations.

Once the processor has thus completed discarding genotypes of a bottom-ranked subset of the output decision trees, processing at process block 660 completes, and processing continues to process block 662.

At process block 662, the processor randomly flips a bit of each genotype of a middle-ranked subset of the output decision trees and add the modified genotype to the next generation set.

In one embodiment, the middle ranked subset includes all the output decision trees not included in the top ranked subset or bottom ranked subset. The processor identifies each of the members of the middle ranked subset in the table of output decision trees. The processor retrieves the genotype of each of the members of the middle ranked subset and randomly selects a bit in the genotype to flip (from 0 to 1 or from 1 to 0), for example by using a random number generator to identify the position of a bit to flip. The processor flips the bit in the genotype (a mutation) and inserts the mutated genotype with the flipped bit into the new array of genotypes for the next generation set. This explores whether output decision tree queries that have middling fitness have adjacent or fairly similar queries with higher fitness by slightly adjusting their genotypes at random and presenting the slightly adjusted genotype in subsequent generations for competition against other genotypes. In one embodiment, mutations that result in duplicate genotypes may be mutated again so as not to waste space in the subsequent generation, although in practice, duplicate genotypes are rare.

Once the processor has thus completed randomly flipping a bit of each genotype of a middle-ranked subset of the output decision trees and add the modified genotype to the next generation set, processing at process block 662 completes, and processing continues to process block 664.

At process block 664, the processor repeats randomly flipping a bit of each genotype of the top-ranked group of output decision trees and adding the modified genotype to the next generation set until the next generation set is the same size as the initial generation set.

Due to discarding the bottom ranked genotypes, the new array of genotypes for the next generation set has fewer than the population size S genotypes in it. In one embodiment, preference is given to the members of the top ranked set to back-fill the available space in the next generation set. In one embodiment, the processor retrieves and rotates through the genotypes of the members of the top ranked set, mutating them (as discussed above with reference to process block 662), and inserting the mutated genotype into the into new array until the new array reaches size S. Thus, the genotype of the first-ranked member of the top ranked set is randomly altered by a single bit and inserted into the new array, followed by the second-ranked member, and so on, repeating from the first-ranked member once the end of the top ranked set is reached, until the new array of genotypes for the next generation has a full population This explores whether output decision tree queries that have high fitness have adjacent or fairly similar queries with even higher fitness by slightly adjusting their genotypes at random and presenting the slightly adjusted genotype in subsequent generations for competition against other genotypes, including the genotypes of top performers in the previous generation.

Once the processor has thus completed randomly flipping a bit of each genotype of the top-ranked group of output decision trees and adding the modified genotype to the next generation set until the next generation set is the same size as the initial generation set, processing at process block 664 completes, and processing continues to process block 668.

At process block 668, the processor replaces the current generation set with the next generation and increments a generation counter. In one embodiment, the processor deletes the current array of genotypes and saves the new array of genotypes in its place. In one embodiment, the processor saves the current array of genotypes under another name for later reference, and saves the new array of genotypes as the current array of genotypes. The processor then adds one to a generation counter—a variable that indicates the number of the current generation. Once the processor has thus completed replacing the current generation set with the next generation and incrementing a generation counter, processing at process block 668 completes, and processing returns to process block 606 to repeat the query generation process for the next generation.

Once all generations have completed, processing continues at process block 658. At process block 658, in response to reaching a final generation set, the processor promotes one of the top-ranked subset of output decision trees of the final generation to be the final decision tree.

In one embodiment, the processor identifies the highest ranked output decision tree query (by fitness, weighted or unweighted), and saves the query string as the final tree. In one embodiment, the processor presents the top-ranked subset of output decision tree queries on a graphical user interface, and accepts a user selection of one of the output decision tree queries as the final tree. The processor then saves the query string for the selected output decision tree query as the final tree.

Once the processor has thus completed promotes one of the top-ranked subset of output decision trees of the final generation to be the final decision tree, processing at process block 658 completes, and processing continues to END block 670, where process 600 ends, and process 300 resumes. Upon completion, process 600 has evolved a graph-language query decision tree with high fitness for identifying graph elements (that is, nodes or edges) that have the objective property value.

Referring again to FIG. 3, once the processor has thus completed progressively evolving output decision trees in a graph query language from the graph query language grammar to generate a final decision tree that accurately predicts the objective property value, processing at process block 325 completes, and processing continues to process block 330.

At process block 330, the processor stores the final decision tree for subsequent execution against a target graph.

In one embodiment, the processor stores the query string of the final decision tree in a library of decision trees. For example, the processor may store the query string in a library table of decision trees. The processor may also store the query string in association with the objective property value, the originating genotype, and the fitness score, weighted fitness score, and/or fitness score weights for the final decision tree. While the objective property value may be enough to describe the purpose of the decision tree, the processor may also accept and store a user-input description of the final decision tree.

The user may then execute the stored query string for the final decision tree against other target graph databases, enabling real-time retrieval of graph elements (that is, nodes or edges) that have the objective property value.

Once the processor has thus completed storing the final decision tree for subsequent execution against a target graph, processing at process block 330 completes, and processing continues to END block 335, where process 300 ends.

Example Graphical User Interface

Figure 7:
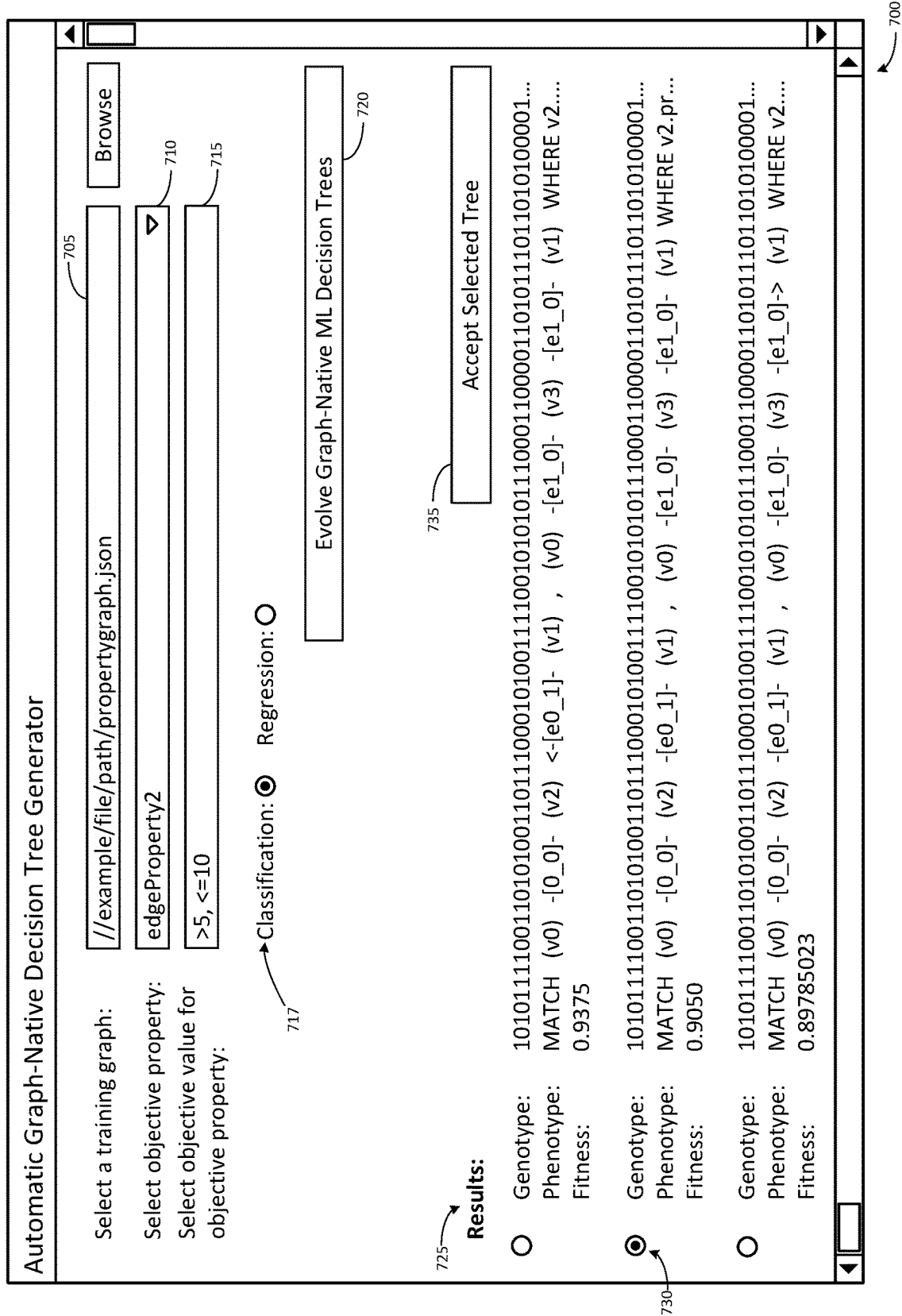
FIG. 7 illustrates one embodiment of a graphical user interface (GUI) associated with providing decision tree learning native to a graph database.

FIG. 7 illustrates one embodiment of a graphical user interface (GUI) 700 associated with providing decision tree learning native to a graph database. The GUI 700 is used to operate some features of graph-native decision tree subsystem 220 of graph database system 205. In one embodiment, GUI 700 is a web page generated by web interface server 230 based on information received from graph-native decision tree components 205. In one embodiment, the GUI 700 is presented to users through computing devices such as personal computers 245, remote user computers 255, or mobile devices 260.

In one embodiment, GUI 700 is configured to accept user inputs and send them to graph-native decision tree subsystem 220. GUI 700 may include a training graph selection input 705 which accepts a file path location of a training graph for use in training a graph-native ML decision tree. Following input of a graph selection in input 705, the processor parses the selected graph to identify all properties of graph elements. The processor then populates an objective property menu 710, such as a dropdown menu, in GUI 700 with the identified properties. The user may then select one objective property from the objective property menu 710 by clicking on the property. GUI 700 may also include an objective property value input 715 into which the user can enter comparison symbols (such as symbols for less than, greater than, less than or equal to, greater than or equal to, equal to, not equal to, LIKE, and NOT LIKE) and a value (numeric, string, or Boolean) for the objective property. For example, the decision tree may be configured to predict whether edgeProperty2 is greater than 5 and less than or equal to 10, as shown at objective property value input 715. Or alternatively, the objective property may be, for example, a flag for a particular classification, such as a suspicious activity report, in which case the objective value may be set to "TRUE." GUI 700 may also include a classification or regression selector input 717, for example by using radio buttons, with which the user may indicate whether the system is seeking regression fitting to the selected objective property or classification matching to the selected objective property. In one embodiment, selection of classification or regression is handled automatically based on the data type of the selected objective property—numerical objective properties are automatically fit with regression, and string and Boolean objective properties are automatically fit with classification. Once input fields 705, 710, and 715 (and, where not automatically handled, input filed 717) are populated, the user may select a button 720 to initiate a process (such as method 300) to automatically evolve a graph native ML decision tree that predicts the objective property value.

In one embodiment, where the user is given the opportunity to examine and select from among the resulting trees with highest fitness after the evolution process is completed, a portion (for example, the top 5%) of the final generation set of decision tree queries are presented in the GUI 700 as results 725 for the user to select from. The displayed results 725 may include genotype, phenotype (decision tree query), and fitness score for each result. The user may make the selection by clicking on a radio button 730 adjacent to the result the user wishes to promote to be the final decision tree and selecting an accept button 735. The processor then promotes the selected result to be the final decision tree.

Software Module Embodiments

In general, software instructions are designed to be executed by one or more suitably programmed processor accessing memory, such as by accessing CPU resources, and in one embodiment desirably in parallel with a memory-light requirement. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

Cloud or Enterprise Embodiments

In one embodiment, the present system (such as graph database system 205) is a computing/data processing system including an application or collection of distributed applications for enterprise organizations. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system is a centralized server-side application that provides at least one or more of the functions disclosed herein and a graphical user interface to access and operate them, and that is accessed by many users via computing devices/terminals communicating with the present computing system (functioning as the server) over a computer network.

Computing Device Embodiments

Figure 8:
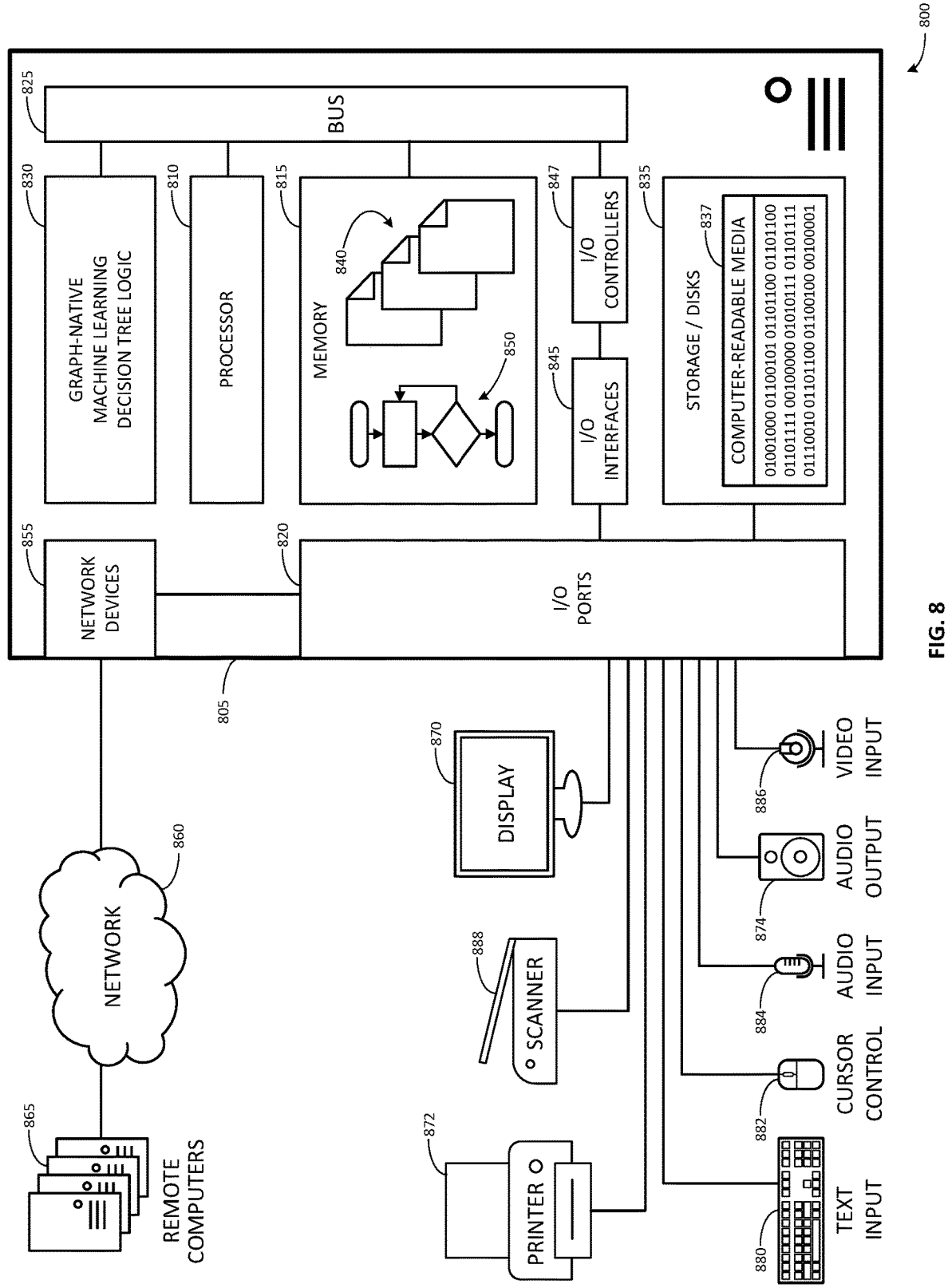
FIG. 8 illustrates an embodiment of a computing system configured with the example systems and/or methods disclosed.

FIG. 8 illustrates an example computing system 800 that is configured and/or programmed as a special purpose computing device with one or more of the example systems and methods described herein, and/or equivalents. The example computing device may be a computer 805 that includes a processor 810, a memory 815, and input/output ports 820 operably connected by a bus 825. In one example, the computer 805 may include graph-native machine learning decision tree logic 830 configured to facilitate decision tree machine learning native to a graph database similar to the logic, systems, and methods shown and described with reference to FIGS. 2-7. In different examples, graph-native machine learning decision tree logic 830 may be implemented in hardware, a non-transitory computer-readable medium with stored instructions, firmware, and/or combinations thereof. While graph-native machine learning decision tree logic 830 is illustrated as a hardware component attached to the bus 825, it is to be appreciated that in other embodiments, graph-native machine learning decision tree logic 830 could be implemented in the processor 810, stored in memory 815, or stored in disk 835 on computer-readable media 837.

In one embodiment, graph-native machine learning decision tree logic 830 or the computing system 800 is a means (such as, structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform dynamic inclusion of custom columns into a logical model. The means may also be implemented as stored computer executable instructions that are presented to computer 805 as data 840 that are temporarily stored in memory 815 and then executed by processor 810.

Graph-native machine learning decision tree logic 830 may also provide means (e.g., hardware, non-transitory computer-readable medium that stores executable instructions, firmware) for performing dynamic inclusion of custom columns into a logical model.

Generally describing an example configuration of the computer 805, the processor 810 may be a variety of various processors including dual microprocessor and other multiprocessor architectures. A memory 81015 may include volatile memory and/or non-volatile memory. Non-volatile memory may include, for example, ROM, PROM, EPROM, EEPROM, and so on. Volatile memory may include, for example, RAM, SRAM, DRAM, and so on.

A storage disk 835 may be operably connected to the computer 805 by way of, for example, an input/output (I/O) interface (for example, a card or device) 845 and an input/output port 820 that are controlled by at least an input/output (I/O) controller 847. The disk 835 may be, for example, a magnetic disk drive, a solid-state disk drive, a floppy disk drive, a tape drive, a Zip drive, a flash memory card, a memory stick, and so on. Furthermore, the disk 835 may be a CD-ROM drive, a CD-R drive, a CD-RW drive, a DVD ROM, and so on. The memory 815 can store a process 850 and/or data 840 formatted as one or more data structures, for example. The disk 835 and/or the memory 815 can store an operating system that controls and allocates resources of the computer 805.

The computer 805 may interact with, control, and/or be controlled by input/output (I/O) devices via the input/output (I/O) controller 847, the I/O interfaces 845 and the input/output ports 820. The input/output devices include one or more displays 870, printers 872 (such as inkjet, laser, or 3D printers), and audio output devices 874 (such as speakers or headphones), text input devices 880 (such as keyboards), a pointing and selection device 882 (such as mice, trackballs, touchpads, touch screens, joysticks, pointing sticks, stylus mice), audio input devices 884 (such as microphones), video input devices 886 (such as video and still cameras), video cards (not shown), disk 835, network devices 855, and so on. The input/output ports 820 may include, for example, serial ports, parallel ports, and USB ports.

The computer 805 can operate in a network environment and thus may be connected to the network devices 855 via the I/O interfaces 845, and/or the I/O ports 820. Through the network devices 855, the computer 805 may interact with a network 860. Through the network 860, the computer 805 may be logically connected to remote computers 865. Networks with which the computer 805 may interact include, but are not limited to, a LAN, a WAN, a cloud, and other networks.

—Selected Advantages—

In one advantage, the systems and methods described herein enable grammatical evolution of graph native ML decision trees in a manner that permits dynamic depth handling (permitting variable degree of separation in nodes) in both training and surveillance phases of operation. This is not possible without the systems and methods described herein. Without the systems and methods herein, the user is required to input a fixed number of edges as the only allowed number of edges, requiring the evolution algorithm to consider only the main node in focus and nodes reachable within that arbitrary number of edges. This is very restrictive, and results in decision trees with poorer fitness (which render less accurate predictions) than those generated by the systems and methods described herein. Further, the more versatile evolution of graph-native ML decision trees enabled by dynamic depth handling allows arrival at a final graph-native ML decision tree in fewer generations than would be possible without the dynamic depth handling.

In another advantage, the systems and methods described herein enables support for arbitrarily complex relationship structures, due both to the dynamic depth handling and the fully flexible nature of evolutionary search to generate the graph-native ML decision tree. The evolutionary search can compare the node and edge properties on a relative basis (for example, v1.nodeProperty4>v2.nodeProperty4), instead of just the absolute basis (for example, v1.nodeProperty4 >5).

Further, the systems and methods herein enable non-intuitive solutions to be discovered that work very well. In competitive domains, when a solution is non-intuitive, it can actually be more robust, since fewer other actors in the domain will adapt to it. For example, in the context of suspicious transaction alerting, a non-intuitive graph-native ML decision tree may prevent criminal actors from discovering the rationale behind an alert and modifying their behavior to overcome it. In this context, the term "non-intuitive" may refer to a solution that does not have an immediately apparent logical basis. Graph-native ML decision trees may even be evolved that are so exotic that they could never be discovered except as described herein.

Note that the complexity of graph data applications can overwhelm even technically savvy people. In another advantage, a graph-native decision tree in accordance with the systems and methods herein can ease the learning curve of working with graph data. For example, after data labeling is completed, the solution for predicting classification labels is found automatically by the systems and methods described herein. In another advantage, a graph-native decision tree in accordance with the systems and methods herein can encapsulate and expand on technical scenarios implemented in PGQL.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
   CD-R: CD recordable.
   CD-RW: CD rewriteable.
DVD: digital versatile disk and/or digital video disk.
HTTP: hypertext transfer protocol.
LAN: local area network.
PGQL: property graph query language.
RAM: random access memory.
   DRAM: dynamic RAM.
   SRAM: synchronous RAM.
ROM: read only memory.
   PROM: programmable ROM.
   EPROM: erasable PROM.
   EEPROM: electrically erasable PROM.
SQL: structured query language.
USB: universal serial bus.
XML: extensible markup language.
WAN: wide area network.
WCC: weakly connected components.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium that includes stored thereon computer-executable instructions that when executed by at least a processor of a computer cause the computer to:
   receive an objective property value of a training graph for a graph-native decision tree to be trained to predict;
   determine feasible ranges of values from the training graph;
   automatically generate a graph query language grammar for graph-native decision trees based on the feasible ranges;
   progressively evolve output decision trees that are expressed in a graph query language from the graph query language grammar to generate a final decision tree that accurately predicts the objective property value, wherein the progressively evolving randomly alters genotypes of random bit series and maps the genotypes into the output decision trees based on the graph query language grammar until the final decision tree is generated; and
   store the final decision tree for subsequent execution against a target graph.

2. The non-transitory computer-readable medium of claim 1:
   wherein the computer-executable instructions to determine feasible ranges of values further comprise instructions that cause the computer to:
      determine a minimum and maximum value for each property of each edge and node in the training graph, and
      determine an average number of edges connected to each node in the training graph; and
   wherein the computer-executable instructions to automatically generate the graph query language grammar further comprise instructions to cause the computer to:
      automatically write a base match structure for the average number of edges from a node into the graph query language grammar,
      automatically write a node identifier structure for the number of nodes that can be connected by the average number of edges into the graph query language grammar, and
      for each of the properties, automatically write a base where structure including the minimum and maximum values for the property.

3. The non-transitory computer-readable medium of claim 1, wherein the instructions that cause the computer to progressively evolve decision trees to reach a final decision tree further cause the computer to:
   produce an initial current generation set of the genotypes of random bit series;
   for each genotype in the current generation set:
      extract a block of bits from the genotype and parse the bits as an integer;
      determine a remainder of the integer divided by a quantity of alternative structures for a nonterminal symbol in the graph query language grammar;
      select one of the alternative structures based on the remainder;
      generate an output decision tree by inserting into an output decision tree:
         terminal symbols of the selected alternative structure, and
         terminal symbols identified by resolving non terminal symbols as indicated by the genotype,
         in an order that the terminal symbols and the nonterminal symbols appear in the selected alternative structure;
      execute the output decision tree on the training graph;
      evaluate fitness of the output decision tree; and
   rank the output decision trees for each genotype in the current generation set by fitness.

4. The non-transitory computer-readable medium of claim 3, wherein the instructions that cause the computer to progressively evolve decision trees to reach a final decision tree further cause the computer to:
   add genotypes of a top-ranked subset of the output decision trees to a next generation set;
   discard genotypes of a bottom-ranked subset of the output decision trees;
   randomly flip a bit of each genotype of a middle-ranked subset of the output decision trees and add the genotype of the middle-ranked subset as modified by the flip of the bit to the next generation set;
   repeat randomly flipping a bit of each genotype of the top-ranked subset of output decision trees and adding the genotype of the top-ranked subset as modified by the flip of the bit to the next generation set until the next generation set is the same size as the current generation set; and
   in response to reaching a final generation set, promote one of the top-ranked subset of output decision trees of the final generation to be the final decision tree.

5. The non-transitory computer-readable medium of claim 1, wherein the objective property value is a label of an edge of the training graph.

6. The non-transitory computer-readable medium of claim 1, wherein the final decision tree is stored in a set of decision trees that together make up a random decision forest.

7. The non-transitory computer-readable medium of claim 1, wherein the instructions further cause the computer to execute the final decision tree against the target graph to predict a property of the target graph.

8. A computer-implemented method comprising:
receiving an objective property value of a training graph for a graph-native decision tree to be trained to predict;
determining feasible ranges of values from the training graph;
automatically generating a graph query language grammar for graph-native decision trees based on the feasible ranges;
progressively evolving output decision trees that are expressed in a graph query language from the graph query language grammar to generate a final decision tree that accurately predicts the objective property value, wherein the progressively evolving randomly alters genotypes of random bit series and maps the genotypes into the output decision trees based on the graph query language grammar until the final decision tree is generated; and
storing the final decision tree for subsequent execution against a target graph.

9. The computer-implemented method of claim 8:
wherein the determination of the feasible ranges of values further comprises:
determining a minimum and maximum value for each property of each edge and node in the training graph, and
determining an average number of edges connected to each node in the training graph; and
wherein the generation of the graph query language grammar further comprises:
automatically writing a base match structure for an average of the number of edges from a node into the graph query langauge grammar,
automatically writing a node identifier structure for the number of nodes that can be connected by the average of the number of edges into the graph query language grammar, and
for each of the properties, automatically writing a base where structure including the minimum and maximum values for the property.

10. The computer-implemented method of claim 8, further comprising:
producing an initial generation set of the genotypes of random bit series;
for each genotype in the initial generation set:
extracting a block of bits from the genotype and parse the bits as an integer;
determining a remainder of the integer divided by a quantity of alternative structures for a nonterminal symbol in the graph query language grammar;
selecting one of the alternative structures based on the remainder;
generating an output decision tree by inserting into the output decision tree;
terminal symbols of the selected alternative structure, and
terminal symbols identified by resolving non terminal symbols as indicated by the genotype, in an order that the terminal symbols and the nonterminal symbols appear in the selected alternative structure;
executing the output decision tree on the training graph;
evaluating fitness of the output decision tree; and
ranking the output decision trees for each genotype in the initial generation set by fitness.

11. The computer-implemented method of claim 10, further comprising:
adding genotypes of a top-ranked subset of the output decision trees to a next generation set;
discarding genotypes of a bottom-ranked subset of the output decision trees;
randomly flipping a bit of each genotype of a middle-ranked subset of the output decision trees and add the genotype of the middle-ranked subset as modified by the flip of the bit to the next generation set;
repeating randomly flipping a bit of each genotype of the top-ranked subset of output decision trees and adding the genotype of the top-ranked subset as modified by the flip of the bit to the next generation set until the next generation set is the same size as the initial generation set; and
in response to reaching a final generation set, promoting one of the top-ranked subset of output decision trees of the final generation to be the final decision tree.

12. The computer-implemented method of claim 11, further comprising:
presenting the top-ranked subset of output decision trees of the final generation on a GUI for review; and
accepting a user input indicating a selection of the one of the top-ranked subset for promotion.

13. The computer-implemented method of claim 8, wherein the objective property value is a label of a node of the training graph.

14. The computer-implemented method of claim 8, wherein a depth of traversal of paths in the training graph is arbitrary during progressive evolution of the output decision trees.

15. A computing system comprising:
a processor;
a memory operably connected to the processor;
a non-transitory computer-readable medium operably connected to the processor and memory and storing computer-executable instructions that when executed by at least a processor of a computer cause the computer to:
receive an objective property value of a training graph for a graph-native decision tree to be trained to predict;
determine feasible ranges of values from the training graph;
automatically generate a graph query language grammar for graph-native decision trees based on the feasible ranges;
progressively evolve output decision trees that are expressed in a graph query language from the graph query language grammar to generate a final decision tree that accurately predicts the objective property value, wherein the
progressively evolving randomly alters genotypes of random bit series and maps the genotypes into the output decision trees based on the graph query language grammar until the final decision tree is generated; and
store the final decision tree for subsequent execution against a target graph.

16. The computing system of claim 15,
wherein the computer-executable instructions to determine feasible ranges of values further comprise instructions that cause the computer to:
determine a minimum and maximum value for each property of each edge and node in the training graph, and determine an average number of edges connected to each node in the training graph; and wherein the computer-executable instructions to automatically generate a graph query language grammar further comprise instructions to cause the computer to:

automatically write a base match structure for an average of the number of edges from a node into the graph query language grammar, automatically write a node identifier structure for the number of nodes that can be connected by the average of the number of edges into the graph query language grammar, and for each of the properties, automatically write a base where structure including the minimum and maximum values for the property.

17. The computing system of claim 15, wherein the computer-executable instructions further cause the computer to:

produce an initial generation set of the genotypes of random bit series;

for each genotype in the initial generation set:
   extract a block of bits from the genotype and parse the bits as an integer;
   determine a remainder of the integer divided by a quantity of alternative structures for a nonterminal symbol in the graph query language grammar;
   select one of the alternative structures based on the remainder;
   generate an output decision tree by inserting into the output decision tree;
      terminal symbols of the selected alternative structure, and
      terminal symbols identified by resolving non terminal symbols as indicated by the genotype,
      in an order that the terminal symbols and the nonterminal symbols appear in the selected alternative structure;

execute the output decision tree on the training graph;
evaluate fitness of the output decision tree;
rank the output decision trees for each genotype in the initial generation set by fitness;
add genotypes of a top-ranked subset of the output decision trees to a next generation set;
discard genotypes of a bottom-ranked subset of the output decision trees;
randomly flip a bit of each genotype of a middle-ranked subset of the output decision trees and add the genotype of the middle-ranked subset as modified by the flip of the bit to the next generation set;
repeat randomly flipping a bit of each genotype of the top-ranked subset of output decision trees and adding the genotype of the top-ranked subset as modified by the flip of the bit to the next generation set until the next generation set is the same size as the initial generation set; and
in response to reaching a final generation set, promote one of the top-ranked subset of output decision trees of the final generation to be the final decision tree.

18. The computing system of claim 15, wherein the computer-executable instructions further cause the computer to store the final decision tree with a target database that includes the target graph.

19. The computing system of claim 15, wherein the computer-executable cause the computer to progressively evolve output decision trees by grammatical evolution of the output decision trees from a Backus-Naur form grammar for property graph query language.

20. The computing system of claim 15, wherein the final decision tree predicts the objective property value based at least in part on a path expression.

* * * * *